United States Patent
Qureshi et al.

(10) Patent No.: US 8,000,947 B1
(45) Date of Patent: Aug. 16, 2011

(54) PARTICLE-BASED CLOTH SIMULATION USING VERLET INTEGRATION WITH FIXED AND STIFF-SPRING CONSTRAINTS SUPPORTING COLLISION DETECTION AND REACTION WITH PROJECTILES IN SPORTS VIDEO GAMES

(75) Inventors: Haroon Qureshi, Burnaby (CA); Asim Shahjahan, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 562 days.

(21) Appl. No.: 12/125,268

(22) Filed: May 22, 2008

(51) Int. Cl.
*G06F 9/455* (2006.01)

(52) U.S. Cl. .......................................................... 703/6

(58) Field of Classification Search .................. 703/2, 6, 703/7; 463/4; 473/478, 434, 480, 438, 446; 273/348.3
See application file for complete search history.

(56) References Cited

U.S. PATENT DOCUMENTS

| | | | | |
|---|---|---|---|---|
| 6,116,605 | A * | 9/2000 | Davey, III | 273/348.3 |
| 6,168,519 | B1 * | 1/2001 | Nakagawa et al. | 463/4 |
| 6,458,050 | B2 * | 10/2002 | Barry | 473/438 |
| 2003/0119611 | A1 * | 6/2003 | Lytle et al. | 473/434 |
| 2003/0181268 | A1 * | 9/2003 | Nelson | 473/480 |
| 2005/0227794 | A1 * | 10/2005 | Bouffard et al. | 473/478 |
| 2007/0275794 | A1 * | 11/2007 | Bouffard et al. | 473/446 |
| 2009/0181810 | A1 * | 7/2009 | Stephenson | 473/446 |

* cited by examiner

*Primary Examiner* — Kandasamy Thangavelu

(57) ABSTRACT

Techniques for simulating the behavior of nets in a real time three dimensional simulation are provided. In a simulated environment, a net is constructed from plurality of particles, and the particles may be laid out in a grid-like pattern. Verlet Integration is used to provide the net with cloth-like behavior in response to collisions. Adjacent particles may be constrained by fixed or stiff-spring constraints, and these constraints are used to determine the behavior of the particles in the event that one or both of the constrained particles are displaced by a collision of an object with the net. Post-integration processing is also performed to prevent ball-through-net phenomena where a ball or other object appears to pass through the net rather than merely colliding with and bounding off of the net.

26 Claims, 14 Drawing Sheets

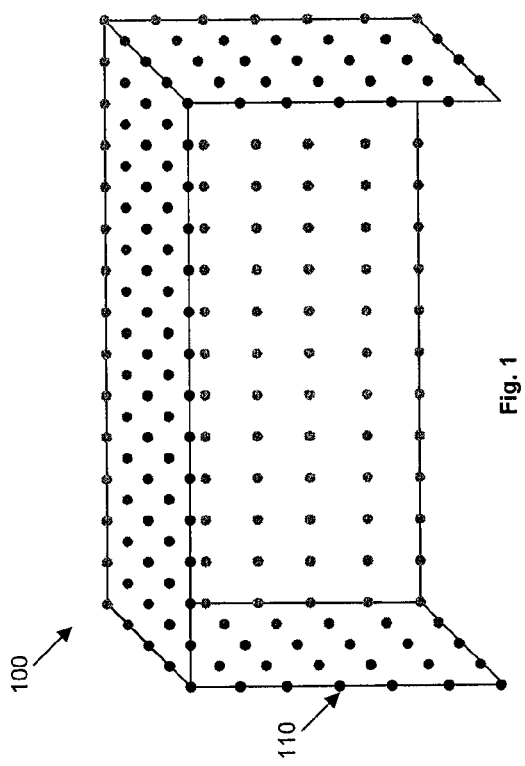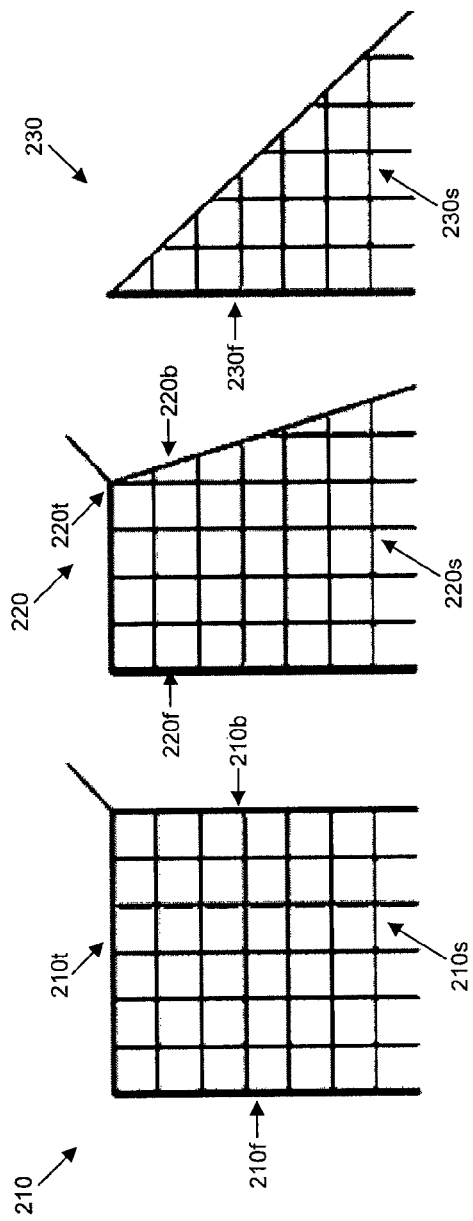

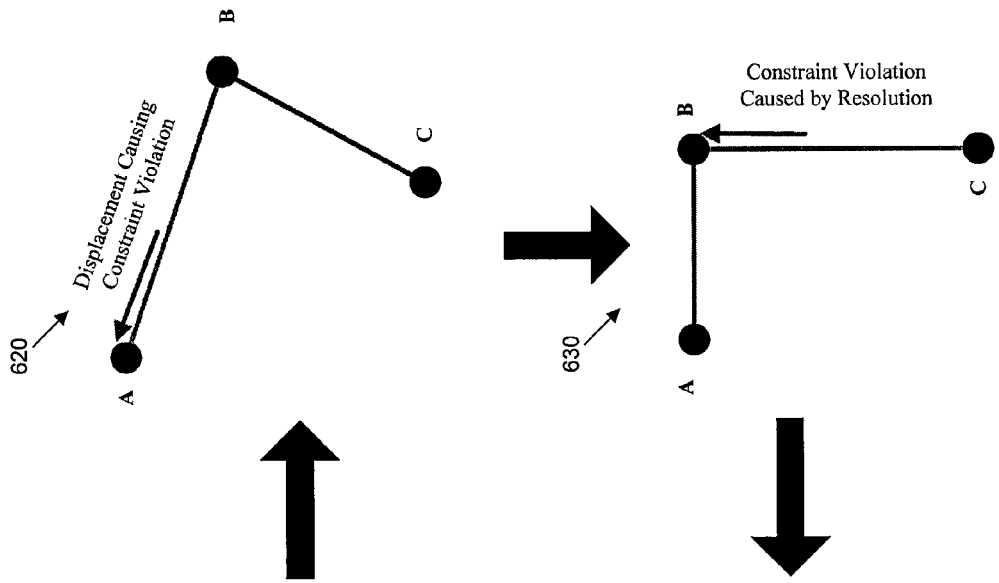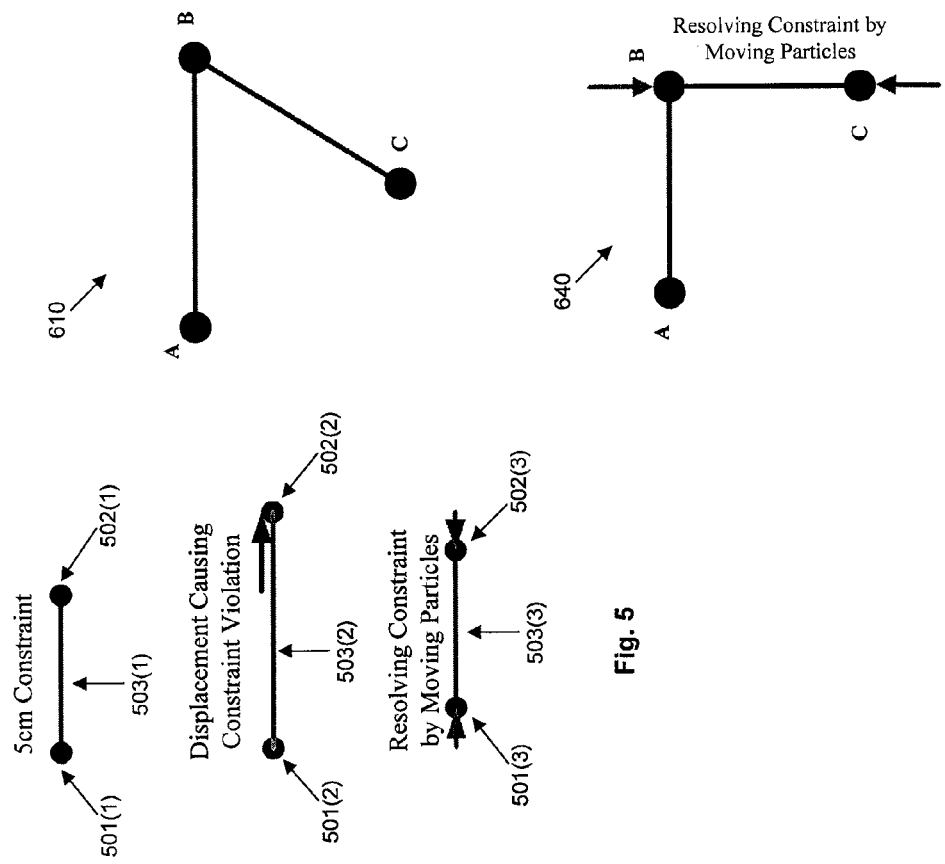
Fig. 6
Fig. 5

Before Constraint Resolution   After Constraint Resolution

PARTICLE-BASED CLOTH SIMULATION USING VERLET INTEGRATION WITH FIXED AND STIFF-SPRING CONSTRAINTS SUPPORTING COLLISION DETECTION AND REACTION WITH PROJECTILES IN SPORTS VIDEO GAMES

BACKGROUND OF THE INVENTION

The present invention relates generally to the field of physics simulation, and more particularly to a method of and system for real-time simulation of nets and collisions therewith by characters and/or object in simulated environment.

As video games continue to increase in complexity, players continue to demand games that provide more and more realistic simulated environment. Players expect characters and objects in the simulated environment to behave like objects in the real world and for characters and/or objects to interact in a realistic fashion.

Sports video games are an extremely popular video game genre, and a number of the sports games provide simulated playing environments of real world sports games that include the use of nets, such as soccer and hockey. Traditionally simulation of nets in a video game environment has been achieved using animations or rigid body systems. However, both of these approaches are limited in their ability to produce realistic simulations of the behavior of nets in real time. For example, animation must be rendered in advance and provides limited flexibility and results in a loss of dynamic quality which may produce a "canned" and unrealistic looking result since the simulation is limited to using only a set of pre-rendered animations to generate all behavior of the nets.

In a real time simulated environment, such as a video game, predicting and animating all of the external forces that may act upon a net in such an environment would be nearly impossible. For example, minute changes in the direction and velocity at which an object collides with a net may produce significantly different deformations in the net. Furthermore, rigid body systems do not provide realistic results when rendering a net. In a rigid body system, the distance between particles comprising an object remain at the same relative distance from one another. In contrast, in a net the relative distance between particles may vary as the fabric of the net stretches and flexes in response to collisions. Thus, neither of the traditional approaches for simulating the behavior of nets produces a very satisfactory result.

In order to meet the demand for increasingly realistic rendering of characters and objects in video games an improved method of simulating the behavior of nets is required.

BRIEF SUMMARY OF THE INVENTION

Embodiments of the present invention provide for realistic simulation of the behavior of nets in real time simulated environments, such as video games. In a simulated environment, a net is constructed from plurality of particles, and the particles may be laid out in a grid-like pattern. Verlet Integration is used to provide the net with cloth-like behavior in response to collisions. Adjacent particles may be constrained by fixed or stiff-spring constraints, and these constraints are used to determine the behavior of the particles in the event that one or both of the constrained particles are displaced by a collision of an object with the net. Post-integration processing is also performed to prevent ball-through-net phenomena where a ball or other object appears to pass through the net rather than merely colliding with and bounding off of the net.

According to an embodiment of the present invention, a method for simulating the behavior of a net in a simulated environment is provided. The method includes determining a resting state of a net where the net comprises of a plurality of particles, determining the motion of adjacent particles that are constrained by stiff-spring constraints, and determining whether a collision has occurred between the net and an object. If a collision occurred between the net and the object, then the following steps are performed: displacing one or more particles in the net in response to collision, resolving position constraint violations caused by displacing one or more particles in the net in response to collision, and relocating the object to the same side of the net where the object was positioned prior to the collision if the object is determined not to be positioned on the same side of the net as prior to the collision.

According to an embodiment of the present invention, a method for simulating the behavior of a net is provided. The method comprises of determining a resting state of a net, where the net comprises of a plurality of particles wherein the motion of adjacent particles is constrained by stiff-spring constraints. The method also comprises of determining whether a collision has occurred between the net and an object. The method further comprises of performing the following steps if a collision is determined to have occurred between the net and an object: (1) displacing one or more particles in the net in response to a collision, (2) resolving position constraint violations caused by displacing one or more particles in the net in response to a collision, (3) determining whether the object is positioned on the same side of the net where the object was positioned prior to the collision, and (4) relocating the object to the same side of the net where the object was positioned prior to the collision if the object was determined not to be positioned on the same side of the net prior to the collision.

According to another embodiment of the present invention, a computer readable medium stores a plurality of instructions for controlling a data processor, that when executed, cause the data processor to perform one or more tasks. The plurality of instructions include: (1) an instruction that causes the data processor to determine a resting state of a net in a simulated environment, the net comprising a plurality of particles wherein the motion of adjacent particles is constrained by stiff-spring constraints; (2) an instruction that causes the data processor to determine whether a collision has occurred between the net and an object; (3) an instruction that causes the data processor to execute the following instructions if a collision has been determined to have occurred: (a) an instruction that causes the data processor to displace one or more particles in the net in response to collision; (b) an instruction that causes the data processor to resolve position constraint violations caused by displacing one or more particles in the net in response to collision; (c) an instruction that causes the data processor to determine whether the object is positioned on a same side of the net where the object was positioned prior to the collision; and (d) an instruction that causes the data processor to relocate the object to the same side of the net where the object was positioned prior to the collision, if the object is determined not to be positioned on the same side of the net as prior to the collision; and (4) an instruction that causes the data processor to generate an output signal comprising a series of images that, when displayed on a display device, represents a view of the simulated environment, including the net, wherein the images represent a sequence of movements from frame to frame of the net. One skilled in the art will recognize that each of the instructions may comprise a set of one or more instructions according to embodiments of the present invention.

Other features and advantages of the invention will be apparent in view of the following detailed description and preferred embodiments.

BRIEF DESCRIPTION OF THE DRAWINGS

FIG. 1 is an illustration of an arrangement of particles representing a net of a soccer goal according to an embodiment.

FIG. 2 is an illustration of arrangements of particles representing several of the net types that can be represented by according to various embodiments.

FIG. 5 is an illustration of the interaction of an adjacent pair of particles linked by a stiff-spring constraint where one of the particles is displaced, resulting in a constraint violation according to an embodiment.

FIG. 6 is an illustration of the interaction of multiple adjacent pairs of particles linked by stiff-spring constraints, such as those described in FIG. 5, to simulate the cloth-like movement of a net, according to an embodiment.

Figure 4:
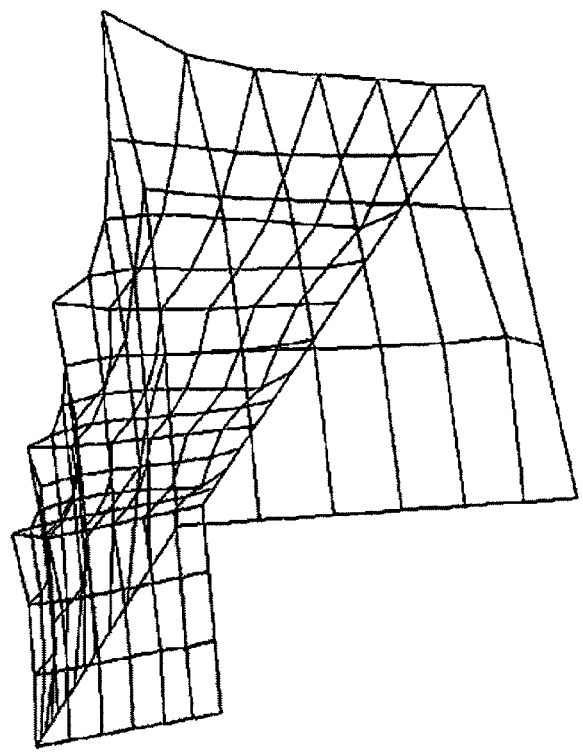
FIG. 4 is an illustration of a resting shape of a simulated soccer net according to an embodiment.

The following detailed description together with the accompanying drawings will provide a better understanding of the nature and advantages of the present invention.

DETAILED DESCRIPTION OF THE INVENTION

Embodiments of the present invention advantageously provide techniques for realistically simulating the behavior of nets to provide a real time simulated three dimensional environment while limiting the processing power, memory consumption and/or other resources required to support the simulation. Unlike traditional systems that use animations or rigid body systems to simulate nets, embodiments of the present invention provide a particle-based system for simulating the behavior of nets and a customized collision detection system for creating realistic interactions between a net and objects and/or characters in a simulated environment.

Embodiments of the present invention uniquely integrate a number of features to provide a unified solution that produces realistic net behavior in a simulated environment, including particle-based cloth simulation using Verlet Integration, fixed and stiff-spring constraint resolution, continuous detection with dynamic objects, customized collision reaction, and post-integration correction to prevent ball-through-net phenomena.

According to embodiments of the present invention, simulation of the behavior of nets may be broken down into five distinct steps: (1) creation, (2) simulation, (3) collision detection, (4) reaction, and (5) post-integration correction. Detailed descriptions of each of these steps, including illustrative embodiments, are provided below.

Creation of Nets

According to an embodiment, nets are created using a particle-based system that provides for realistic simulation of net behavior including reacting to collisions with objections and/or characters within the simulated game environment. A net is represented by an arrangement of particles such that a surface defined by the particles represents the netting.

According to an embodiment, the particles comprising a net may be arranged in a simple grid-like pattern. FIG. 1 provides an illustration of such a grid-like arrangement of particles representing a soccer goal net 100 according to one embodiment. The top and sides of net 100 are comprised of a plurality of particles, such as particle 110, that form a grid-like pattern representing netting material such as that used in real-life. The number of particles used to represent a net may be varied depending upon the desired resolution of the net and the amount of processing power available for generating the simulation of the net. Furthermore, one skilled in the art will recognize that different patterns of particles may be used to construct the fabric of the net.

The layout of the particles comprising a net may also be varied in order to support a wide variety of net types. FIG. 2 illustrates a profile view of three different net configurations that may be simulated according to embodiments of the present invention. One skilled in the art will recognize that the embodiments illustrated herein are merely illustrative and that other net configurations may also be simulated according to different embodiments.

Net 210 is roughly shaped like a rectangular prism, comprising an open front-side 210f, two lateral sides 210s (only one of which is seen in this profile view), top side 210t, and a back side 210b. Front-side 210f, lateral sides 210s, top side 210t, and back side 210b comprise particles in a grid-like configuration.

Net 220 comprises an open front-side 220f, two lateral sides 220s (only one of which is seen in this profile view), top side 220t, and a back side 220b. Front-side 220f, lateral sides 220s, top side 220t, and back side 220b comprise particles in a grid-like configuration.

Net 230 is roughly shaped like a tetrahedron. Net 230 comprises an open front-side 230f and two lateral sides 230s (only one of which is seen in this profile view). Front-side 230f and lateral sides 230s comprise particles in a grid-like configuration.

Simulation of Nets

The behavior of the nets constructed from the particles according to the embodiments described above is determined through the use of Verlet Integration with fixed and stiff-spring constraints to simulate the movement of the particles comprising the net. External forces, such as gravity and the ground, and internal forces, such as fixed and stiff-spring constraints, control the behavior of the net and ensure that the net behaves like a real net suspended from goal posts and affixed to the ground.

Embodiments of the present invention use Verlet Integration to simulate the movement of particles comprising a net. Verlet Integration is a method for simulating the movement of particles using the current and previous positions of the particles. If no external forces are acting upon a particle, the Verlet Integration algorithm changes the position of the particle for each frame of a simulation such that the particle appears to travel in a straight line. Verlet Integration is often used in molecular dynamics simulations that model the motion of atoms and may also be used in methods for simulating the behavior of cloth.

Gravity is an external force that acts on all of the particles in every frame of the simulation that causes the particles to drift toward the ground. For example, the gravity causes portions of a simulated net to sag toward the ground when the net is at rest.

The ground constraint is a simple constraint that prevents particles from falling through a ground plane. For example, a ground constraint may be used to prevent characters and objects in a sports simulation from falling through a ground plane that represents a field or other playing surface.

Fixed constraints used to prevent the Verlet Integration algorithm from changing the position of a particle. For example, fixed constraints may be used to anchor particles of a net to a support pole and the particles at the anchor point would be prevented from changing position by the fixed constraint.

Stiff-spring constraints are constraints between two particles that are used to ensure that the particles remain a specific distance from one another. Stiff-spring constraints can be used to maintain the position of particles comprising a net relative to other particles comprising the net.

Embodiments of the present invention advantageously combine each of the above concepts to provide for dynamic and realistic animation of nets. Traditional techniques used to simulate the behavior of nets, such as animation and rigid-body simulation, do not incorporate all of these concepts when simulating a net.

Figure 3:
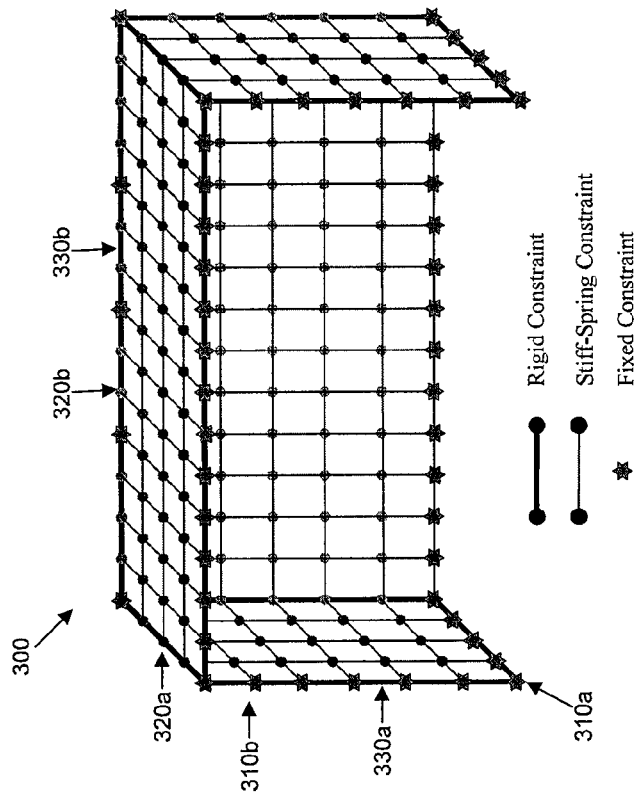
FIG. 3 is an illustration of a soccer goal net comprising fixed particles affixed to the goal posts, the ground, and back rope supports and stiff-spring constraints between each vertically and horizontally adjacent pair of particles.

FIG. 3 is an illustration of a soccer goal net 300 constructed according to an embodiment. Net 300 comprises fixed and stiff-spring constraints. Fixed constraints are used to affix some of the particles comprising the net to goal posts, the ground, and back rope supports. Goal posts and back ropes are comprised of rigid constraints that are fixed and do not move in response to an external force. Stiff-spring constraints are used between each vertically and horizontally adjacent pair of particles. Particles having fixed constraints that prevent the Verlet Integration algorithm from changing the position of those particles are denoted with a star-shaped point, such as particles 310a and 310b. Particles not having fixed constraints are denoted with a round point, such as particles 320a and 320b. Stiff-spring constraints joining particles are denoted by a straight line, such as constraints 330a and 330b.

Fixed constraints are used to anchor the net to the ground, goal posts and back rope supports. A typical real world goal net often includes similar anchor points where the netting material is affixed to supports that give the net its characteristic shape. Anchoring the net in the simulation helps to maintain the position and the shape of the net. Anchor points may be selected that are similar to locations where a net is in the real world or may be varied to depending upon the shape of the net to be simulated and the desired behavior of the net.

Stiff-spring constraints used between vertically and horizontally adjacent pairs of particles help to maintain the cloth-like composition of the netting material by maintaining the relative position of the adjacent particles to one another. The stiff-spring constraints enable net 300 to flex and distort like the fabric of a real net in response to a collision with a game object or character and pull the net back into the a pre-collision position after the collision. Stiff-spring constraints may be used to link particles having a fixed constraint to particles not having a fixed constraint. In the event that a particle not having a fixed constraint is displaced by a collision, the stiff-spring constraint linking the particle with a fixed constraint will pull the displaced particle back to a pre-collision position relative to the particle having the fixed constraint.

FIG. 4 is an illustration of a resting shape of a simulated soccer net 400 according to an embodiment. Net 400 is similar to net 300 described above. Like net 300, net 400 is comprised of a plurality of particles in a cloth-like configuration where the particles are joined by stiff-spring constraints to maintain the shape of the net and at least a portion of the particles include fixed constraints that prevent those particles from changing position.

The resting shape of net 400 illustrates the effect of the gravity external force on the net. The gravity external force exerts a downward pull (toward the ground plane) on the particles comprising the net. Particles having fixed constraints, such as particles 310a and 310b described above, anchor the net material and help maintain the shape and position of the net. The stiff-spring constraints joining the particles of the net resist the downward pull of the gravity external force and ensure that the net retains a cloth-like structure. The combined effects of the gravity forces and the stiff-spring constraints result in the net settling into a resting state where the net sags slightly toward the ground plane. The result is a more realistic resting shape for the net.

During the simulation, a plurality of update steps are performed. For each update step, each of the spring constraints comprising the net is tested for a violation of the spring constraint. Each stiff-spring constraint separates constrained particles at a predetermined distance. If one or both of the constrained particles are displaced and the distance between the particles varies from the predetermined distance a constraint violation occurs. Testing for a violation of the constrain merely involves monitoring the distance between the constrained particles. In the event that a violation is detected, the particles constrained by the spring constraint are repositioned to resolve the violation. In the event that a constrained particle has a fixed constraint, the particle with the fixed constraint cannot be repositioned to resolve the violation, and the other constrained particle will be repositioned in order resolve the violation.

Figure 19:
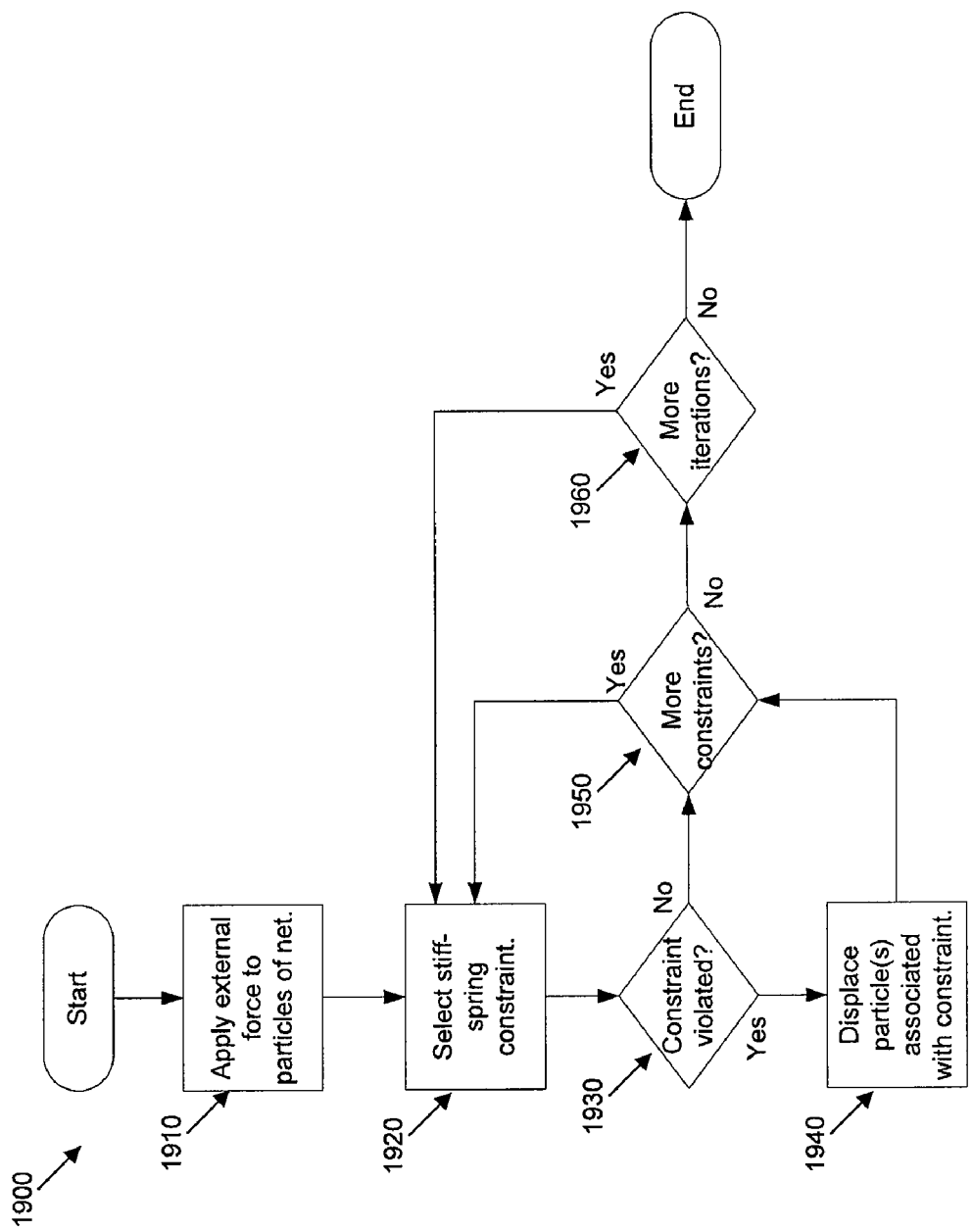
FIG. 19 is a flowchart illustrating a method for determining a resting state of net according to an embodiment of the present invention.

FIG. 19 is a flowchart illustrating a method 1900 for determining the resting state of net according to an embodiment of the present invention. Method 1900 may be performed by software (e.g. computer program code) executed by a processor, by hardware, or a combination thereof. Method 1900 begins with step 1910 where at least a portion of the particles comprising the net are displaced in response to applying one or more external forces to the particles comprising the net. As described above, external forces such as gravity, wind and/or other external forces not related to a collision may be applied to the net in order to simulate the behavior of a net settling into a resting position when the net is not responding to a collision with a simulated object or character. Processing then continues with step 1920.

At step 1920, a stiff-spring constraint is selected, where the stiff-spring constraint constrains the motion of two adjacent particles comprising the net. The order in which the stiff-spring constraints are tested is typically not important, as long as all of the stiff-spring constraints are tested.

At step 1930 a determination is made whether the a constraint violation has occurred as a result of applying the external forces to the particles of the net in step 1910. If a constraint violation has occurred, method 1900 continues to step 1940. Otherwise, processing continues with step 1950.

Figure 7:
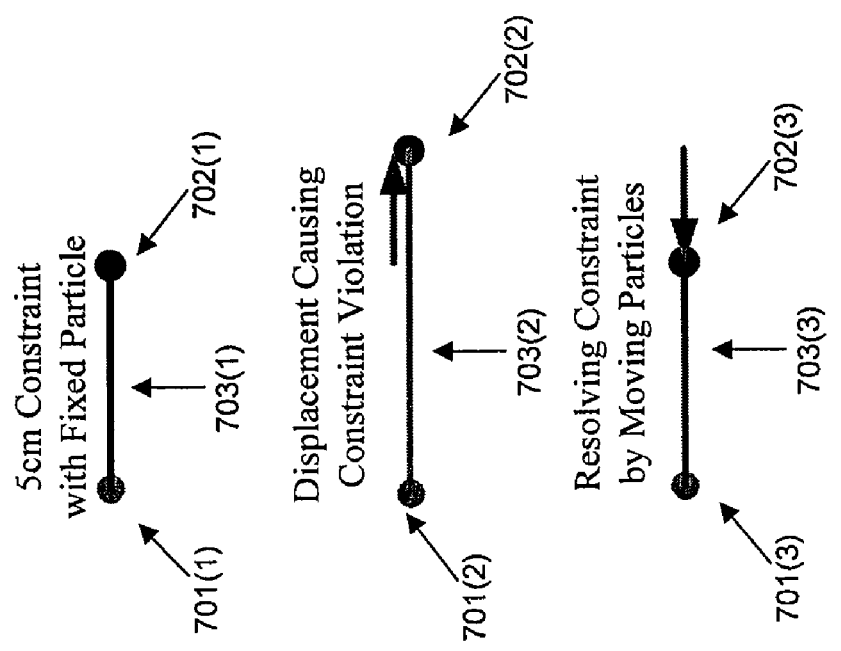
FIG. 7 is an illustration of the interaction of an adjacent pair of particles linked by a stiff-spring constraint, one particle being a fixed particle and the other being an unfixed particle, according to an embodiment.

At step 1940, at least one particle constrained by the stiff-spring constraint is displaced in order to resolve the constraint violation. If neither of the particles constrained by the stiff-spring constraint is also constrained by a fixed constraint, then the both particles are moved relative to one another in order to resolve the constraint violation. FIG. 5, described below, illustrates this technique. Alternatively, if one of the particles constrained by the stiff-spring constraint is also constrained by a fixed constraint, the only the non-constrained particle is moved relative to the constrained particle in order to resolve the constraint. FIG. 7, described below, illustrates this technique.

At step 1950, a determination is made whether the net includes more stiff-spring constraints to be tested. While the order that the stiff-spring constraints is tested may not have much of an impact on the simulation, all of the stiff-spring constraints comprising the net should be tested in order to ensure that the simulation accounts for stiff-spring constraints that may have been violated due to particles of the net being displaced.

If no more stiff-spring constraints remain to be tested, method 1900 continues with step 1960. Otherwise, if more stiff-spring constraints remain to be tested, method 1900 returns to step 1920.

At step 1960, a determination is made whether another iteration of testing all of the stiff-spring constraints should be performed. The number of iterations to be performed may be configurable for each simulation, and if multiple nets are included in a simulation, the number of iterations to be performed for each net may separately configurable. According to an embodiment, all of the stiff-spring constraints comprising the net should be tested at least twice in order to provide more realistic behavior of the net. If the spring-constraints are tested too few times, the net may appear to distort unrealistically in response to a collision. For example, a slight impact could cause the net to bulge dramatically. However, if the spring-constraints are tested too many times, the net may appear to be very rigid and deform very little, appearing to react to the collision more like a wall than a mesh net. For example, if twenty or thirty iterations are performed, the net may behave as if it were very rigid.

If another iteration of testing is not required, then method 1900 terminates. Otherwise, method 1900 returns to step 1920. According to an embodiment, step 1960 may further comprise determining whether all of the stiff-spring constraints comprising the net have been tested at least once where no constraint violations have been found. If all of the stiff-spring constraints comprising the net have been tested at least once without encountering a constraint violation, then a resting state of the net has been reached.

FIG. 5 is an illustration of the interaction of an adjacent pair of particles 501 and 502 linked by a stiff-spring constraint 503 where one of the particles is displaced, resulting in a constraint violation according to an embodiment. Instances of objects are depicted for each of the time periods using parenthetical numbers. At a first point in the simulation, two particles 501(1) and 502(1) are constrained by a stiff-spring constraint 503(1) of 5 centimeters (cm). At a second point in the simulation, the one of the particles 502(2) is displaced by 5 cm (the other particle 501(2) is not displaced). As a result of the displacement, particle 501(2) is now 10 cm from particle 502(2), and constraint 503(2) has been violated. At a third step in the simulation, in order to resolve the violation of constraint 503(3), particle 501(3) is moved directly toward the particle 502(3) by 2.5 cm. Even though the particle 502(1) was displaced and particle 501(1) was not displaced at the first point of time in the simulation, both points end up being repositioned in order to resolve the violation. However, if one of the particles were constrained by a fixed constraint, the other particle would be moved directly toward the other particle by 5 cm in order to resolve the violation. For example, if particle 501 were constrained by a fixed constraint, particle 501 would not have been displaced at the third point in the simulation described above and particle 502 would have been displaced by 5 cm (resulting in particle 502 returning to the position originally occupied by particle 502 prior to displacement).

The cloth-like movement of a net is created by the interaction of the plurality of spring constraints that interconnect the particles of the net. As one constraint violation is resolved, the particles constrained by the spring constraint are often relocated in order to resolve the constraint. Particles comprising a net may be constrained by multiple spring forces and relocating a particle in order to resolve a violation may result in one or more other spring constraints being violated.

FIG. 6 is an illustration of the interaction of multiple adjacent pairs of particles linked by stiff-spring constraints, such as those described in FIG. 5, to simulate the cloth-like movement of a net, according to an embodiment. FIG. 6 illustrates the interaction between three particles A, B and C, with a stiff-spring constraint between particles A and B and another stiff-spring constraint between particles B and C. At a first point in the simulation 610, particles A, B and C are in a resting position where both the stiff-spring constraint between particles A and B and the stiff-spring constraint between particles B and C are currently satisfied. At a second point in the simulation subsequent to the first point in the simulation, particle A is displaced causing a violation of the stiff-spring constraint between particles A and B. At a third point in the simulation 630, particles A and B are moved directly toward one another in order to resolve the violation of the stiff-spring constraint between particles A and B. However, moving particle B in order to resolve the violation of the stiff-spring constraint between particles A and B results in the stiff-spring constraint between particles B and C being violated. At a fourth point in the simulation 640, particles B and C are relocated directly toward one another in order to resolve the violation of the stiff-spring constraint between particles B and C. The stiff-spring constraint between particles A and B may again be violated as a result of particle B being relocated to resolve the violation of the stiff-spring constraint between particles B and C.

Thus, as illustrated, relocating particles to resolve a violation of a first constraint may cause a violation of one or more other constraints. Eventually, as each of the constraint violations are resolved by shifting the position of the particles of each constraint that is violated, the system will eventually reach a stable state. By limiting the number of iterations by which constraints are resolved per frame of the simulation, the particles of the net will appear to ripple in a cloth-like manner.

FIG. 7 is an illustration of the interaction of an adjacent pair of particles linked by stiff-spring constraint 703, particle 701 being a fixed particle (a particle having a fixed constraint) and particle 702 being an unfixed particle. When resolving a violation of a spring constraint between a fixed and an unfixed particle, the unfixed particle is the only particle that is moved to satisfy the constraint.

FIG. 7 illustrates the interaction between particle 701, particle 702 and spring constraint 703 at three points in time of a simulation. Instances of objects are depicted for each of the time periods using parenthetical numbers. At a first point of time in the simulation, the particles are in a stable state, with fixed particle 701(1) and unfixed particle 702(1) being linked by stiff-spring constraint 703(1). At a second point of time in the simulation, subsequent to the first point in time, unfixed particle 702(2) is displaced causing a violation of stiff-spring constraint 703(2) between fixed particle 701(2) and unfixed particle 702(2). At a third point of time in the simulation, subsequent to the second point in time, unfixed particle 702(3) is moved directly toward fixed particle 701(3) in order to resolve the violation of stiff-spring constraint 703(3). Unlike the embodiment described in FIG. 5 where both particle 501 and particle 502 are unfixed particles and both particle 501 and particle 502 are moved in order to resolve the violation of spring constraint 503, only unfixed particle 702(3) is relocated in order to resolve the violation of stiff-spring constraint 703(3).

Once the downward force of gravity is balanced by the upward forces of the spring constraints between the particles of the net, the net reaches a stable state. Once reaching this stable state, no further simulation is necessary until additional external forces act upon the net. For example, the net may remain in the stable state until an external force such as a collision with a game object (such as a ball or hockey puck) or with a game character (such as a soccer or hockey player) results in an external force being applied to the net. Furthermore, one skilled in the art will recognize that other external forces may be applied to the net, such as environmental forces, such as wind and/or other external forces that would require the net to react to the external force.

Collision Detection

Collision detection between rigid bodies is a relatively straightforward process. Collision detection between a rigid body, such as a soccer ball, and a net is not as straightforward though, because in some instances a ball might pass between the particles comprising the net without colliding with any of the particles if the diameter of the ball is smaller than the constraint distance between the particles comprising the net.

Figure 17:
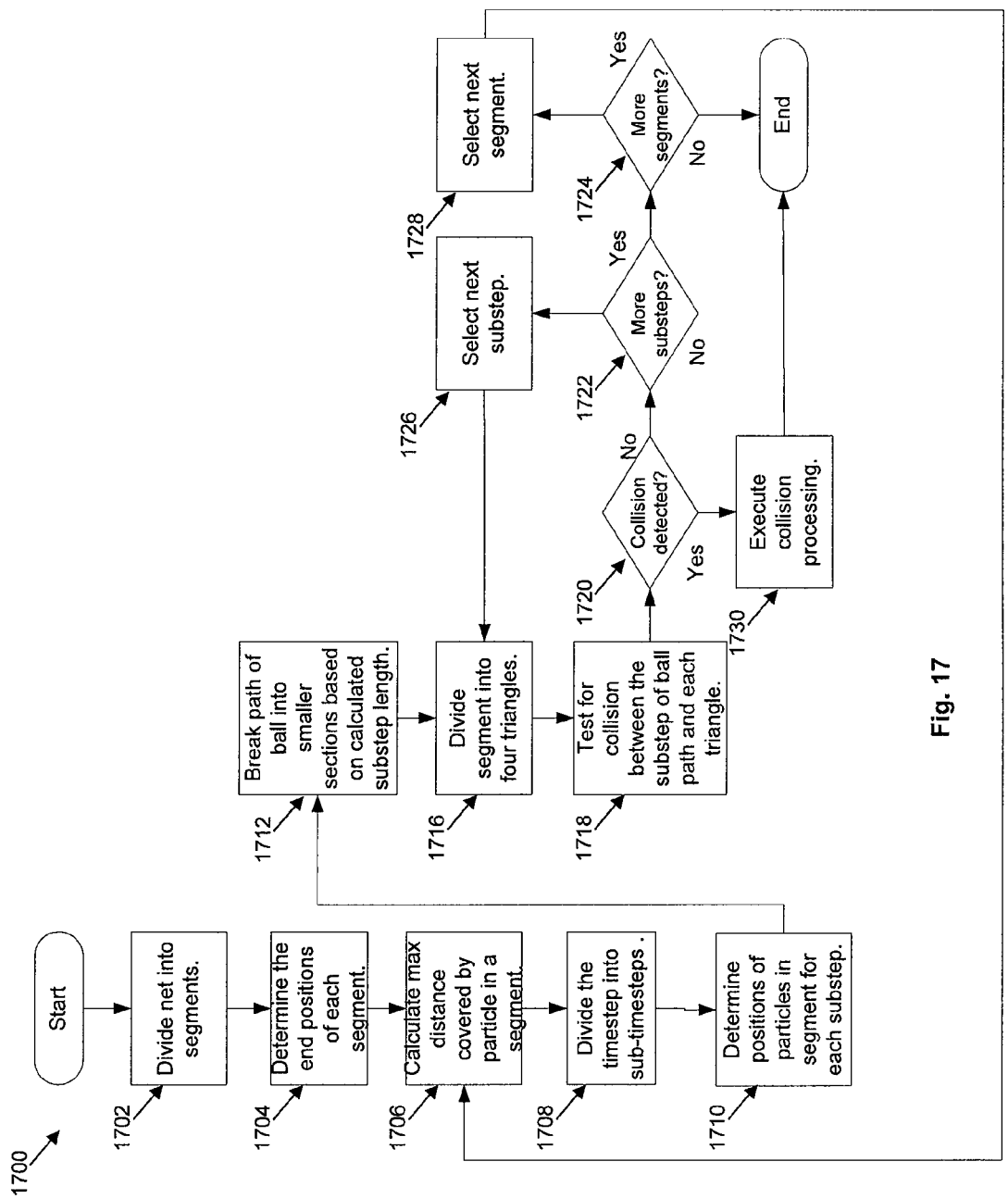
FIG. 17 is a flow diagram of a method for determining whether a collision has occurred with a net according to an embodiment.

FIG. 17 is a flow diagram of a method 1700 for determining whether a collision has occurred with a net according to an embodiment. The net may comprise a set of fixed and unfixed particles joined by stiff-spring constraints, such as net 100 or net 300 described above. Method 1700 takes into account the spacing between the particles comprising the net when determining whether a collision has occurred between a net and a solid body, such as a ball.

Figure 8:
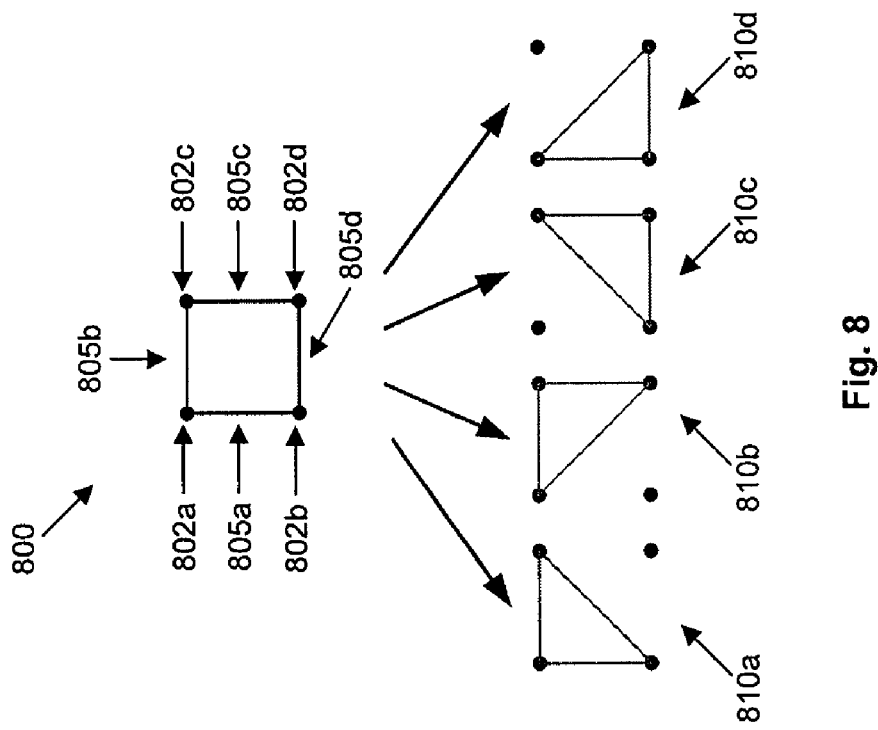
FIG. 8 is an illustration of a segment of a net broken into triangles for use in determining whether a collision has occurred with the net according to an embodiment.

Method 1700 begins with step 1701 and proceeds to step 1702. At step 1702, a net for which collision detection is to be performed is divided up into segments. Each segment should comprise four particles such that the particles form a four-sided shape where each edge of the shape corresponds to a spring constraint associated with two of the particles comprising the segment. FIG. 8 illustrates a segment 800 of a net created by dividing a net comprising a plurality of particles, such as net 100 and net 300 described above. Segment 800 is comprised of four particles 802a, 802b, 802c and 802d and four spring constraints 805a, 805b, 805c and 805d. Particles 802a and 802b are constrained by spring constraint 805a, particles 802a and 802c are constrained by spring constraint 805b, particles 802c and 802d are constrained by spring constraint 805c, and particles 802d and 802b are constrained by spring constraint 805d. Returning now to FIG. 17, after the net is divided into segments, method 1700 continues with step 1704.

At step 1704, an end position is determined for each segment of the net. The end position represents a position at which the segment will be located at the end of a the current timestep of the simulation. The end position of the segment is determined from the velocity of each of the particles comprising the segment for the current timestep. The velocity of the particles of the segment may be zero if the net is currently in a resting state or the velocity of the particles of the segment may be greater than zero if the net has recently been disturbed by an external force and has not yet returned to a resting state. Method 1700 continues with step 1706.

At step 1706, a maximum distance covered by one of the particles comprising one of the segments of the net is determined for the current timestep. The maximum distance of the particle will be used to determine how many sub-timesteps into which the current timestep should be divided.

At step 1708, the timestep is subdivided into a plurality of sub-timesteps. The number of sub-timesteps is determined using the maximum distance covered by one of the particles comprising the current segment. The timestep is divided such that the particle that traveled the farthest distance during the timestep travels no farther than ¼ of the radius of the ball. Subdividing the timestep into multiple sub-timesteps ensures that the particles comprising the segment of the net do not accidentally travel past the ball (or other solid body) being tested for a collision with the net.

At step 1710, the position of the particles comprising the current segment are determined for each sub-timestep. The positions of the particles at each sub-timestep will be used in determining whether a collision has occurred during at least one sub-timestep comprising the timestep.

At step 1712, the path of the ball during the course of the timestep is broken up into subsections that represent that portion of the path of the ball during the sub-timestep. According to an embodiment, the path of the ball is represented as a line with a radius, which is also known as a "capsule" or a "fatline." FIG. 9, described below, illustrates a capsule representing the path of a soccer ball according to an embodiment.

Once the fat-line has been determined for each sub-timestep, segment fatline intersection testing is performed for each sub-timestep to determine whether a collision has occurred. The segment fatline intersection testing begins with step 1716. At step 1716, the segment currently being processed is divided into four triangles. FIG. 8 illustrates net segment 800 being divided into four triangles 810a, 810b, 810c and 810d each of which will be tested to determine whether a collision has occurred.

At step 1718, a collision test is performed to determine whether the fatline associated with the current sub-timestep intersects any of the triangles determined in step 1716. According to an embodiment, a line-triangle intersection test is performed determine whether the fatline associated with the current sub-timestep intersects with any of the triangles determined in step 1716. Various techniques for implementing a line-triangle intersection test are known in the art, and a detailed description is omitted as not being critical to understanding the present invention.

At step 1720, a determination is made whether a collision occurred in step 1718. If a collision occurred, then method 1700 continues with step 1730 where collision processing is executed. Collision processing includes identifying a subset of particles of the net to be displaced and displacing the particles to simulate a collision between the object and the net. According to an embodiment, four particles closest to the center of the object are identified and displaced. The displacement of particles in response to a collision is described in detail below with regard to FIG. 10. After collision processing is complete, method 1700 terminates at step 1799. Collision processing is described in detail below. Otherwise, if no collision occurred, then method 1700 continues with step 1722.

At step 1722, a determination is made whether there are any more sub-timesteps to be processed. If more sub-timesteps remain to be processed, method 1700 continues to step 1726 where a next sub-timestep is selected for processing before method 1700 returns to step 1718. If no more sub-timesteps remain to be processed, method 1700 continues to step 1724.

At step 1724, a determination is made whether any more segments of the net remain to be processed. If more segments of the net remain to be processed, method 1700 proceeds to step 1728 where a next segment to be processed is determined. Method 1700 then returns to step 1706. Otherwise, if no more segments remain to be processed, no collision occurred between the ball (or other solid body) and the net. Method 1700 then terminates at step 1799.

Figure 9:
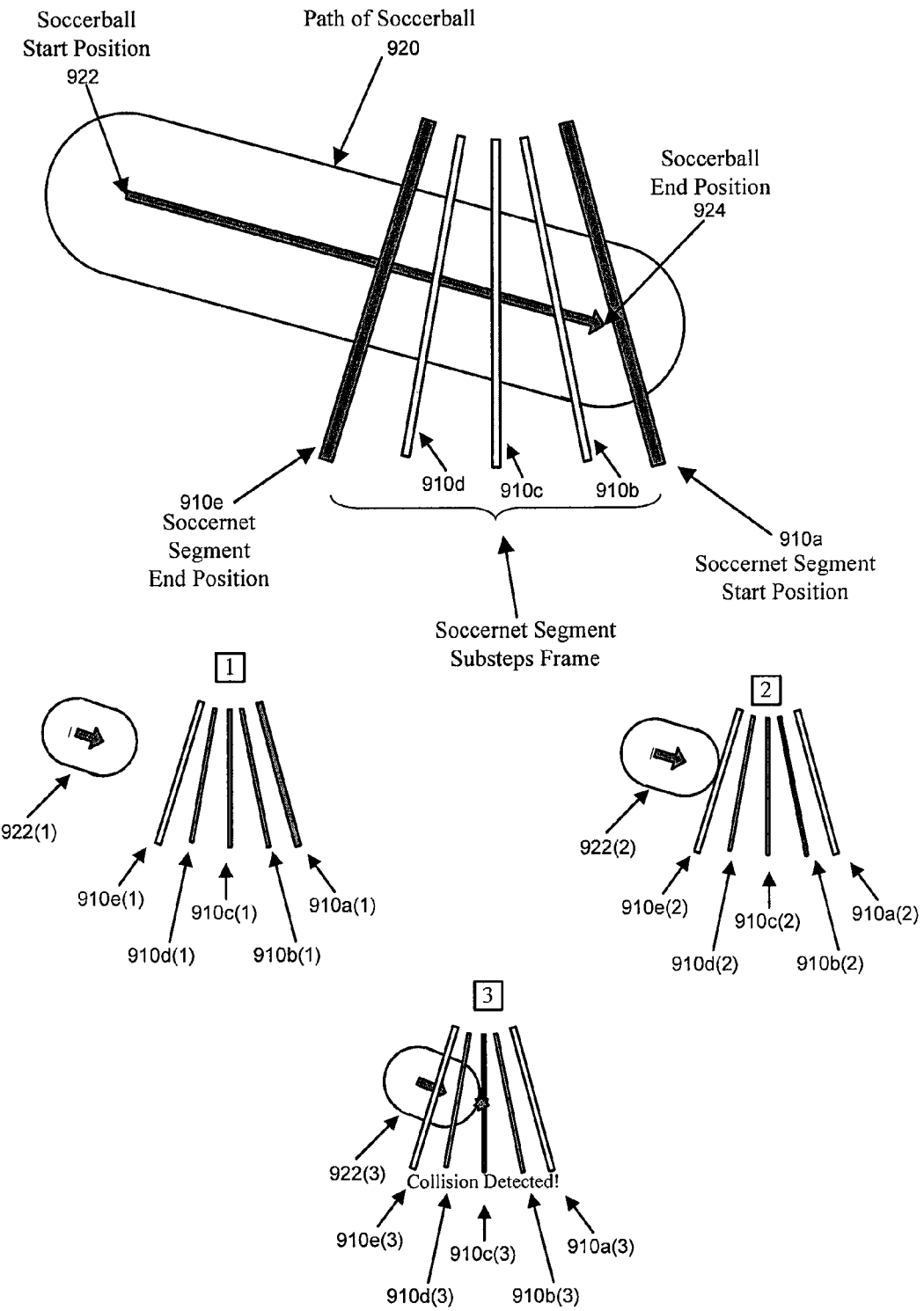
FIG. 9 is a diagram of a segment of a net illustrating the substeps performed when determining whether a collision has occurred between the segment and a ball path according to an embodiment.

FIG. 9 illustrates the steps of performing a fat-line intersection test such as that described in FIG. 17. A path of a soccer ball for a timestep of a simulation is represented by capsule 920. Capsule 920 extends along the length of the path of the soccer ball for a single timestep of the simulation. Starting position 922 indicates the initial position of the soccer ball at the beginning of the timestep and ending position 924 indicates the projected final position of the soccer ball based upon the velocity and direction in which the soccer ball was traveling at the beginning of the timestep. Ending position 924 is merely a projected final position of the soccer ball if no collision occurs. If a collision occurs, the actual ending position of the soccer ball may be very different.

Net segment start position 910a indicates the starting position of a segment of the net at the beginning of the timestep, and net segment end position 910e indicates the ending position of the segment of the net at the end of the timestep (step 1704). The position of the net segment is determine for each of a plurality of sub-timesteps such that for each sub-timestep, no particle in the segment travels farther than ¼ the radius of the ball (steps 1708 and 1710). The timestep illustrated in FIG. 9 has been subdivided into four sub-timesteps and the position of the net segment has been determined for each sub-timestep. Net segment positions 910b, 910c and 910d represent the position of the net at the end of the first three sub-timesteps and net segment ending position 910e represents the position of the net at the end of the fourth sub-timestep.

FIG. 9 further depicts the processing performed for each of the three sub-timesteps to determine whether a collision has occurred. The segment of the path of the soccer ball during the sub-timestep is represented by capsule segment 922(1) which comprises the portion of the capsule 922 representing the path of the ball traversed during the current sub-timestep (division of the path by sub-timestep is described in step 1712). The segment net positions 910a(1), 910b(1), 910c(1), 910d(1) and 910e(1) represent the ending net positions 910a, 910b, 910c, 910d and 910e described above. In this collision detection step, the initial position of the ball represented by capsule segment 922(1) and the initial position of the net segment 910a(1) are compared to determine if a collision occurred. Collision detection may be performed by dividing the net segment into four triangles (step 1716) and determining whether the capsule subsection 922(1) intersects any of the triangles (step 1718). Capsule segment 922(1) does not intersect with the net segment at initial position of the net segment 910a(1). Therefore, the collision test is performed for the next sub-timestep.

The segment of the path of the soccer ball during the second sub-timestep is represented by capsule segment 922(2) which comprises the portion of the capsule 922 representing the path of the ball traversed during the current sub-timestep (division of the path by sub-timestep is described in step 1712). The segment net positions 910a(2), 910b(2), 910c(2), 910d(2) and 910e(2) represent the ending net positions 910a, 910b, 910c, 910d and 910e described above. In this collision detection step, the position of the ball represented by capsule segment 922(2) and the position of the net segment 910a(2) are compared to determine if a collision occurs during the sub-timestep. As described above, collision detection may be performed by dividing the net segment into four triangles (step 1716) and determining whether the capsule subsection 922(2) intersects any of the triangles (step 1718). Capsule segment 922(2) does not intersect with the net segment at initial position of the net segment 910a(2). Therefore, the collision test is performed for the next sub-timestep.

The segment of the path of the soccer ball during the second sub-timestep is represented by capsule segment 922(3) which comprises the portion of the capsule 922 representing the path of the ball traversed during the current sub-timestep (division of the path by sub-timestep is described in step 1712). The segment net positions 910a(3), 910b(3), 910c(3), 910d(3) and 910e(3) represent the ending net positions 910a, 910b, 910c, 910d and 910e described above. In this collision detection step, the position of the ball represented by capsule segment 922(3) and the position of the net segment 910a(3) are compared to determine if a collision occurs during the sub-timestep. As described above, collision detection may be performed by dividing the net segment into four triangles (step 1716) and determining whether the capsule subsection 922(3) intersects any of the triangles (step 1718). Capsule segment 922(3) does intersect with the net segment at initial position of the net segment 910a(3). Therefore, the collision test terminates and as a result of the collision, reaction processing is performed to simulate the response of the net to the collision.

Reaction

In the event that a collision is detected between a rigid body (such as a ball) and the net, the net must react to the collision. The reaction of the net is produced by displacing specific particles based upon collision data determined during the collision detection process described above.

Figure 10:
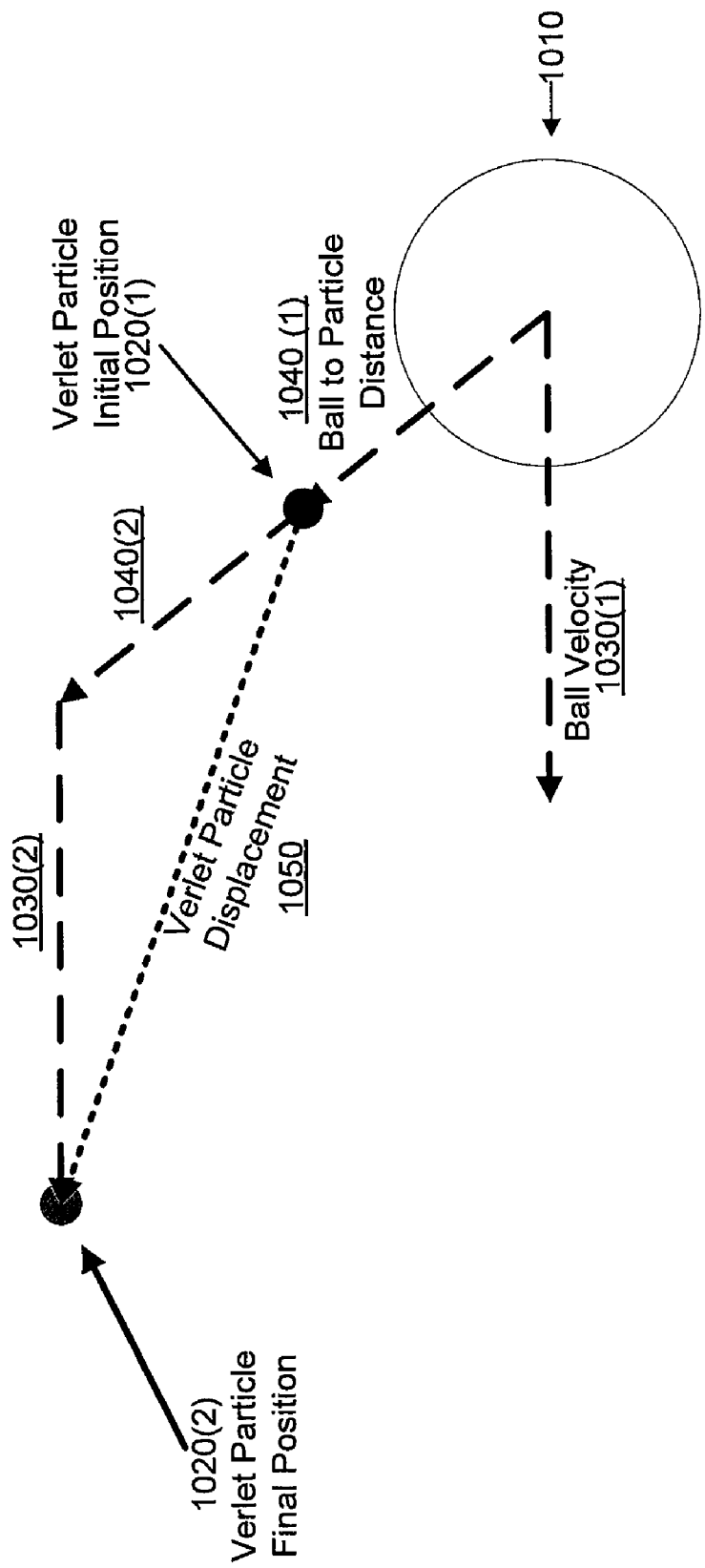
FIG. 10 is an illustration of a net particle being displaced in response to a collision with a ball according to an embodiment.

According to an embodiment, the four particles of the net closest to the point of impact are displaced. The displacement of the four particles closest to the point of impact is determined based upon the velocity of the ball and a vector from the center of the ball to the position of the particle. FIG. 10 illustrates the displacement of a particle 1020 of a net by a ball 1010 according to an embodiment. Initial position 1020(1) represents the position of the particle 1020 prior to particle 1020 being displaced by ball 1010. Final position 1020(2) represents the position of particle 1020 after being displaced by ball 1010. Particle displacement 1050 is determined based upon the velocity of ball 1010 and distance of particle 1020 from the center of ball 1010.

Vector 1040(1) is a vector from the center of ball 1010 to the particle 1020 and vector 1030(1) is a vector from an initial position of the ball at the beginning of a timestep of the simulation to a projected final position of the ball at the end of the timestep as determined from the velocity of the ball at the beginning of the timestep. Vector 1040(2) is a vector projected from the initial position 1020(1) of particle 1020 having the same direction and magnitude as vector 1040(1). Vector 1030(2) is a vector projected from the initial position 1020(1) of particle 1020 having the same direction and magnitude as vector 1030(1). Vector 1050, which is used to determine the final position 1020(2) of particle 1020, is determines by adding vector 1040(2) and vector 1030(2).

Once the particles closest to the point of collision have been displaced, a simulation step (such as that described above) is performed in order to correct any constraint violations that may have occurred as a result of the displacement. As the simulation is performed in response to the collision, the particles comprising the net will ripple and flow in a cloth-like manner as some constraint violations are resolved by relocating particles associated with the constraints that have been violated and other constraints are violated as the particles are relocated. Eventually, over a period of timesteps the net will return to a resting state where particles reach an equilibrium state where no constraints are violated. As described above, the number of iterations of constraint resolution are performed during each frame of the simulation, which results in the net forming a bulge where the ball or other solid body has collided with the net.

Figure 11E:
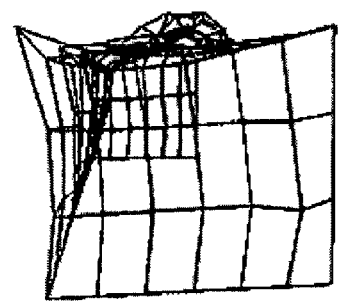
FIGS. 11A-11I provide a series of illustrations of a net reacting to a ball collision.
Figure 11D:
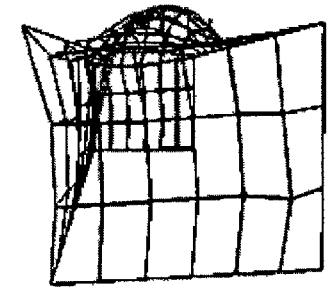
Figure 11C:
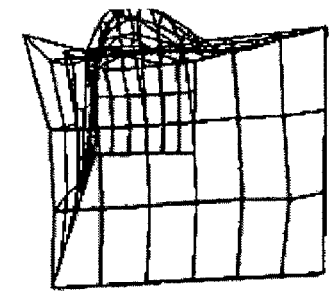
Figure 11B:
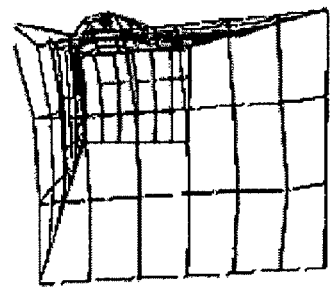
Figure 11A:
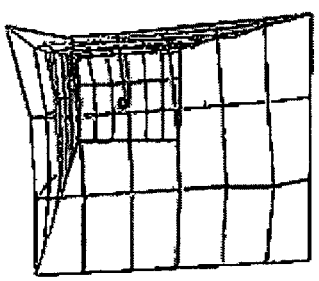
Figure 11I:
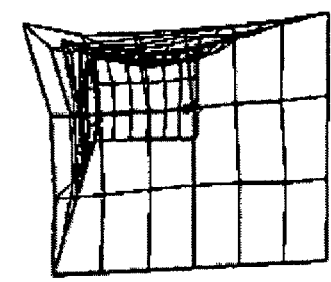
Figure 11H:
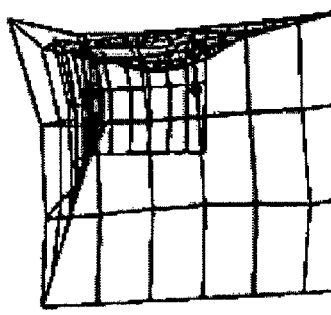
Figure 11G:
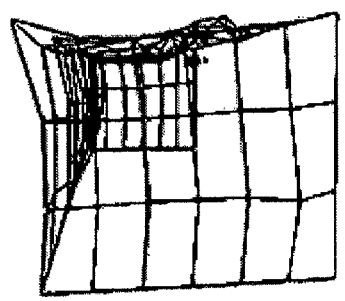
Figure 11F:
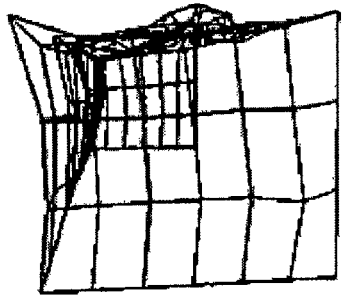

FIGS. 11A-11I provide a series of illustrations of a ball approaching a net, colliding with the net, and the net rippling in response to the collision. In FIG. 11A, the ball can be seen approaching the net. In FIG. 11B, the ball has contacted the net and displaced a portion of the net, forming a bulge near the point of contact between the ball and the net. In FIG. 11C, the bulge produced by the displacement of the net particles has increased. In FIG. 11D, the simulation step begins to correct the constraint violations caused by the displacement of the net, and in FIGS. 11E and 11F, the displacement is further corrected. FIGS. 11D, 11E and 11F illustrate the effect of limiting the number of constraint violations that may be corrected during each timestep of the simulation. The net returns to a resting state over a series of timesteps to provide a more realistic simulation of the net behavior rather than merely "jumping" from the displaced state to a resting state in a single time step. FIGS. 11G, 11H and 11I illustrate the net rebounding in the opposite direction as the constraint violations are resolved over a series of timesteps.

The behavior of the ball in response to the collision may be determined using calculations for the conservation of momentum with a co-efficient of restitution. According to the law of conservation of momentum, for a collision occurring between two objects in an isolated system, the total momentum of the two objects before the collision is equal to the total momentum of the two objects after the collision. The coefficient of restitution of an object is a fractional value representing the ratio of velocities of the object before and after a collision. The value of the coefficient of restitution is generally a number in the range [0,1], where "1" represents a perfectly elastic collision and "0" represents a perfectly inelastic collision. The collision of the ball with the net is an elastic collision, and thus may be modeled using standard calculations known in the art as the conservation of momentum with a co-efficient of restitution.

Post-Integration Correction

Post-integration correction may be required in some instances to prevent a ball or other solid body from appearing to pass through the net. Positions of particles comprising a net are directly manipulated when resolve constraints, and in some instances, the particles of the net may be rearranged such that the ball or other solid body seems to pass through the net.

Figure 12:
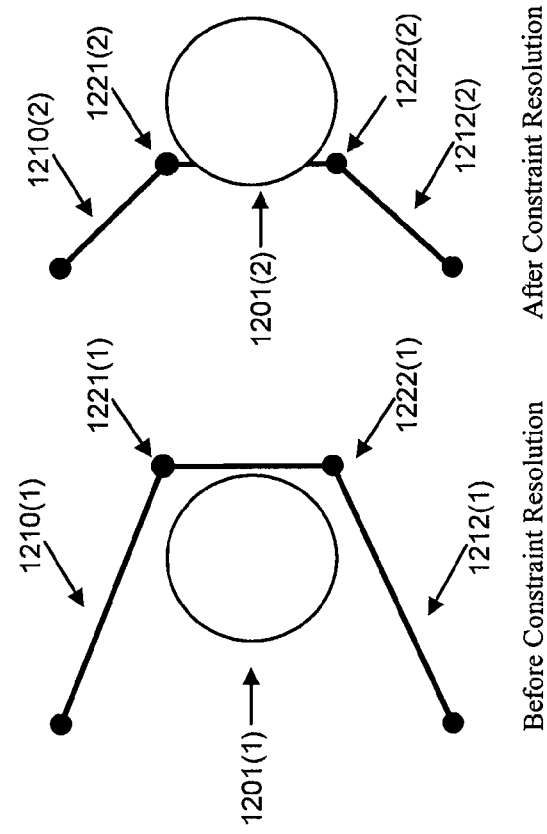
FIG. 12 is an illustration of a ball passing through a net due to constraint resolution according to an embodiment.

FIG. 12 illustrates an occurrence of a ball 1201 appearing to pass through a net as constraint violations are resolved. FIG. 12 illustrates the relative position of the ball and net particles at a first point in time prior to constraint violations being resolved and at a second point in time after the constraint violations have been resolved. Instances of objects are depicted for each of the time periods using parenthetical numbers, where "1" is used indicate instances of object associated with the first time period and "2" is used to indicate instances of the objects associated with the second time period.

Prior to constraint violation resolution, constraints 1210(1) and 1212(1) have been violated due to displacement of particles 1221(1) and 1222(1). Ball 1201(1) appears on the correct side of the net which is the side of the net that the ball struck and caused displacement of particles 1221(1) and 1222(1).

However, once the constraint violations are resolved, the ball appears to have passed through the net. As a result of resolving the violation of constraints 1210(2) and 1212(2), particles 1221(2) and 1222(2) have changed positions and ball 1201(2) appears to have passed through the net. Post-integration correction needs to be applied to the ball to ensure that the ball appears on the correct side of the net.

Figure 18:
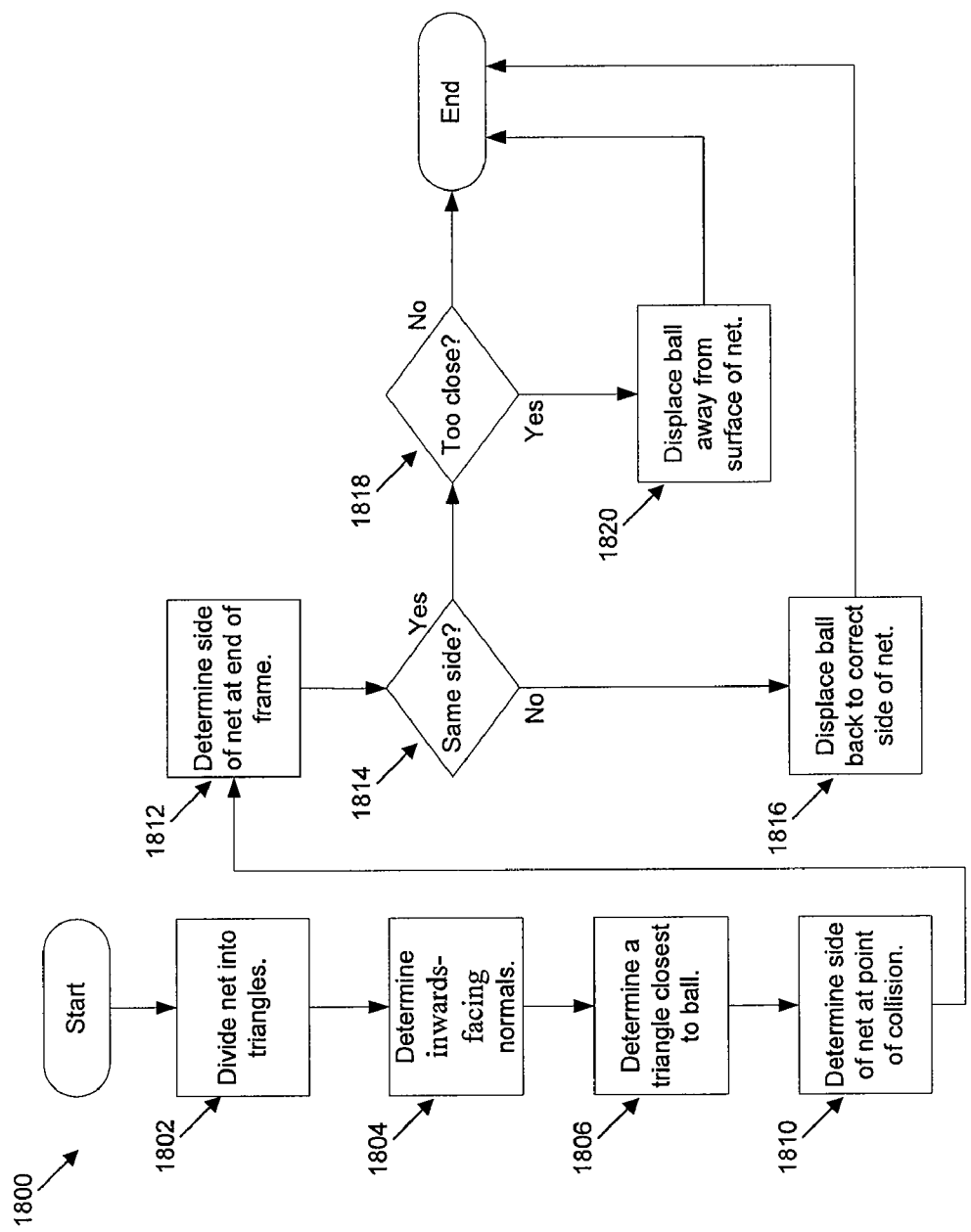
FIG. 18 is a flow diagram of a method for determining whether a ball or other solid object has ended up on the wrong side of a net after a collision.

To ensure that the ball remains on the correct side of the net, a post-processing step is performed where a determination is made as to which side of the net the ball was on at the moment of collision, and upon detecting that the ball is now on a different side of the net, displacing the ball back to the correct side of the net. FIG. 18 is a flow diagram of method 1800 for performing post-processing to determine whether a ball (or other solid body) that has collided with the net is now on the wrong side of the net and for displacing the ball or other solid body back to correct side of the net. Method 1800 may be performed by software (e.g. computer program code) executed by a processor, by hardware, or a combination thereof.

At step 1802, which depicts the post-processing step, the net is broken up into triangles. According to an embodiment, the vertices of the triangles are formed using particles comprising each of the segments of the net (similar to what is done in step 1716 of collision detection method 1700 described above).

Figure 13:
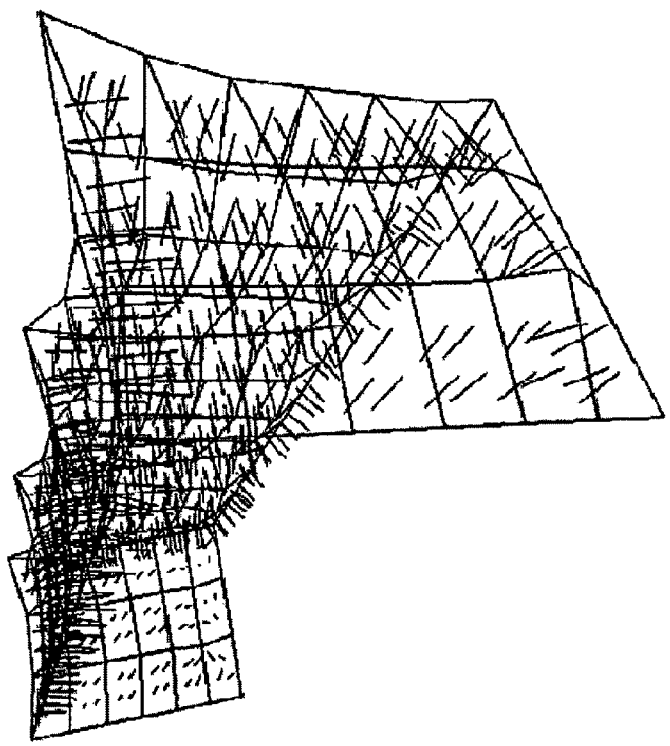
FIG. 13 is an illustration of inwards-facing normals calculated for triangles comprising each of the segments of the net which may be used to ensure that a ball remains on the correct side of the net according to an embodiment.

At step 1804, for each triangle created in step 1802, an inwards-facing normal is calculated using the cross-product of two vectors that form the triangle. FIG. 13 is an illustration of inwards-facing normals calculated for triangles comprising each of the segments of a net according to an embodiment.

Figure 14:
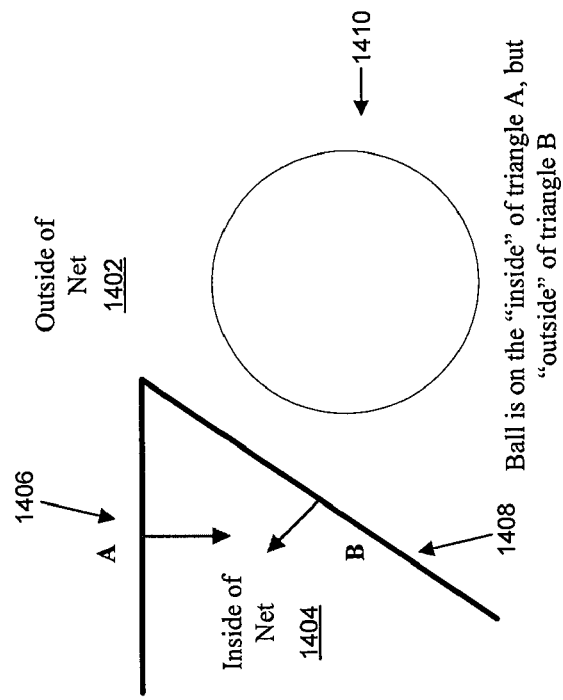
FIG. 14 is an illustration of determining the position of a ball relative to triangles comprising one or more segments of a net according to an embodiment.

Due to the layout of the particles comprising a net, it's possible for a ball to be on the "inside" of some triangles and the "outside" of other triangles. FIG. 14 illustrates the situation where a ball 1410 is inside some triangles of a net and outside of others. Ball 1410 is positioned in area 1402 outside of the net. Area 1404 comprises the area inside of the net. Ball 1410 is "inside" of triangle A (1406) but "outside" of triangle B (1408) when compared to the inward facing normals of triangle A (1406) and triangle B (1408).

At step 1806, a triangle closest to the center of the ball is determined. In order to ensure proper behavior, only the closest triangle is considered. According to an embodiment, the closest triangle is determined by taking the average distance from all three points of the triangle to the center of the ball. The triangle having the smallest average distance is selected. Referring back to FIG. 8, triangle B (1408) is closest to ball 1410, and by comparing the inward-facing normal of triangle B (1408) to the position of ball 1410, ball 1410 is determined to be outside of the net. Had triangle A (1406) instead been selected, an erroneous result indicating that ball 1410 was inside of the net would have been determined.

Returning now to FIG. 18, at step 1810, a determination is made whether the ball is inside of or outside of the net at the time the point in time when the ball first contacts the net. At step 1812, a determination is made whether the ball is inside of or outside of the net at the end of the frame. At the end of the frame, the ball might be positioned completely on the same side of the net where the ball stared, positioned on the wrong side of the net, or positioned too close to the net.

At step 1814, a determination is made whether the ball is on the correct side of the net. The determination is made by comparing the side of the net that the ball was on when the ball first contacted the net (from step 1810) and the side of the net that the ball was on at the end of the frame (from step 1812). If the ball was not on the same side of the net at the point of contact and at the end of the frame, then the ball is not on the correct side of the net.

If the ball is not on the correct side of the net, method 1800 proceeds to step 1816, and if the ball is on the correct side of the net, method 1800 proceeds to step 1818.

At step 1816, the ball is displaced to the correct side of the net. If the ball is completely on the correct side of the net, the ball does not need to be repositioned. If the ball is on the other side of the triangle, the position of the ball is changed such that the ball is touching the face of the triangle on the correct side of the triangle.

Figure 15:
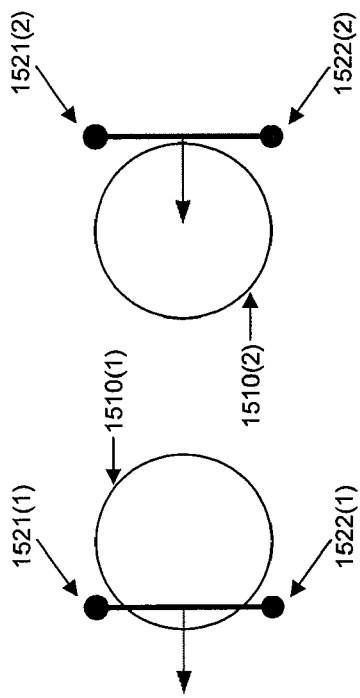
FIG. 15 provides an illustration of repositioning of a ball from the wrong side of a net to the correct side of a net, according to an embodiment.

FIG. 15 illustrates the position of a ball 1510 at the end of a frame and the position of ball 1510 after correction. Instances of objects are depicted for each of the time periods using parenthetical numbers, where "1" is used indicate instances of object at the end of the frame and "2" is used to indicate instances of the objects associated after correcting the position of ball 1510. At the end of the current frame, ball 1510(1) is positioned outside of the net due to displacement of particle 1521(1) and particle 1522(1) resulting from ball 1510(1) colliding with the net. Particle 1521(1) and particle 1522(1) were displaced as constraint violations resulting from the collision were resolved, and ball 1510(1) ended up outside of the net. Particle 1521(1) and particle 1522(1) are two of the three particles comprising the triangle closest to the center of ball 1510(1). During post-integration processing, the inside-pointing normal of the closest triangle is used to determine whether the ball is outside of the net when the ball should inside of the net. Ball 1510(2) is relocated such that the ball is touching the face of the triangle comprising particle 1521(2) and particle 1522(2). Once the ball has been displaced to the correct side of the net, method 1800 terminates.

At step 1816, a determination is made whether the ball is too close to the net. If the ball is too close to the net, method 1800 proceeds to step 1820. Otherwise, the ball is not too close to the net, method 1900 ends.

At step 1820, the ball is displaced away from the side of the net. Method 1800 ends upon completion of step 1820. If the distance from the center of the ball to the triangle closest to the center of the ball is less than that of the radius of the ball, the ball is displaced such that the ball is touching the face of the closest triangle.

Figure 16:
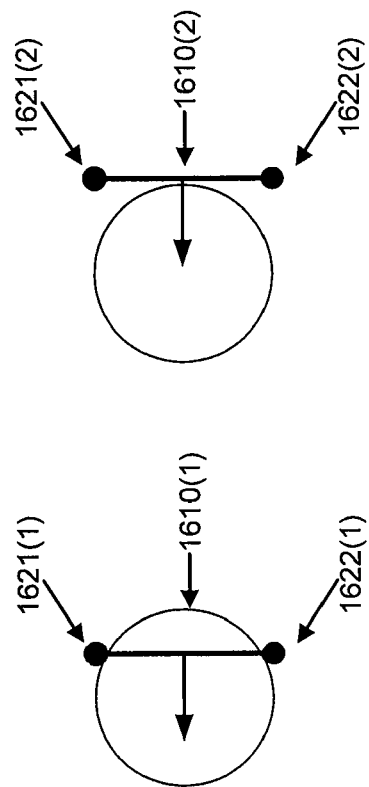
FIG. 16 provides an illustration of repositioning of a ball located too close to a net.

FIG. 16 illustrates the position of a ball 1610 at the end of the current frame and the position of ball 1610 after correction. Instances of objects are depicted for each of the time periods using parenthetical numbers, where "1" is used indicate instances of object at the end of the frame and "2" is used to indicate instances of the objects associated after correcting the position of ball 1610. At the end of the current frame, ball 1610(1) is positioned inside of the net, but is positioned too close to the net due to displacement of particle 1621(1) and particle 1622(1) resulting from ball 1610(1) colliding with the net. Particle 1621(1) and particle 1622(1) were displaced as constraint violations resulting from the collision were resolved, and ball 1610(1) ended up being positioned on the correct side of the net (in contrast to the example in FIG. 15), but the ball ended up too close to the net. Particle 1621(1) and particle 1622(1) are two of the three particles comprising the triangle closest to the center of ball 1610(1). During post-integration processing, the inside-pointing normal of the closest triangle is used to determine whether the ball is too close to the net. Ball 1610(2) is relocated such that the ball is touching the face of the triangle comprising particle 1621(2) and particle 1622(2). Once the ball has been displaced to the correct side of the net, method 1800 terminates at step 1899.

Overview of Game Computing System

These techniques may be implemented in software, hardware, or a combination thereof, and may be incorporated into video games and/or other simulations to simulate the behavior of nets. For example, the techniques for simulating the behavior of nets may be incorporated into a physics engine used to determine the movement of objects and/or characters in a video game or other simulated environments. A physics engine incorporating these techniques may be used to determine the position of particles of a net within a simulated environment, and positional data generated by the physics engine may then be provided to a rendering engine that generates a visual representation of the simulated environment. According an embodiment of the present invention, the rendering engine may generate a visual representation of the net by mapping a net texture between points representing the position of the particles comprising the net. According to some embodiments of the present invention, the rendering engine may also perform additional processing on the positional data provided by the physics engine when generating a visual representation of the net and/or other objects, such as determining lighting and/or shadows.

The techniques disclosed herein may be used in a variety of types of video games and/or other real-time simulated environments that provide simulations of sports that include nets, such as soccer, hockey and basketball. One skilled in the art will recognize that the use of the techniques described herein is not limited solely to sports simulations, and that these techniques may also be incorporated into other types of simulations in which characters and/or object interact with nets and/or other net-like fabrics.

Figure 20:
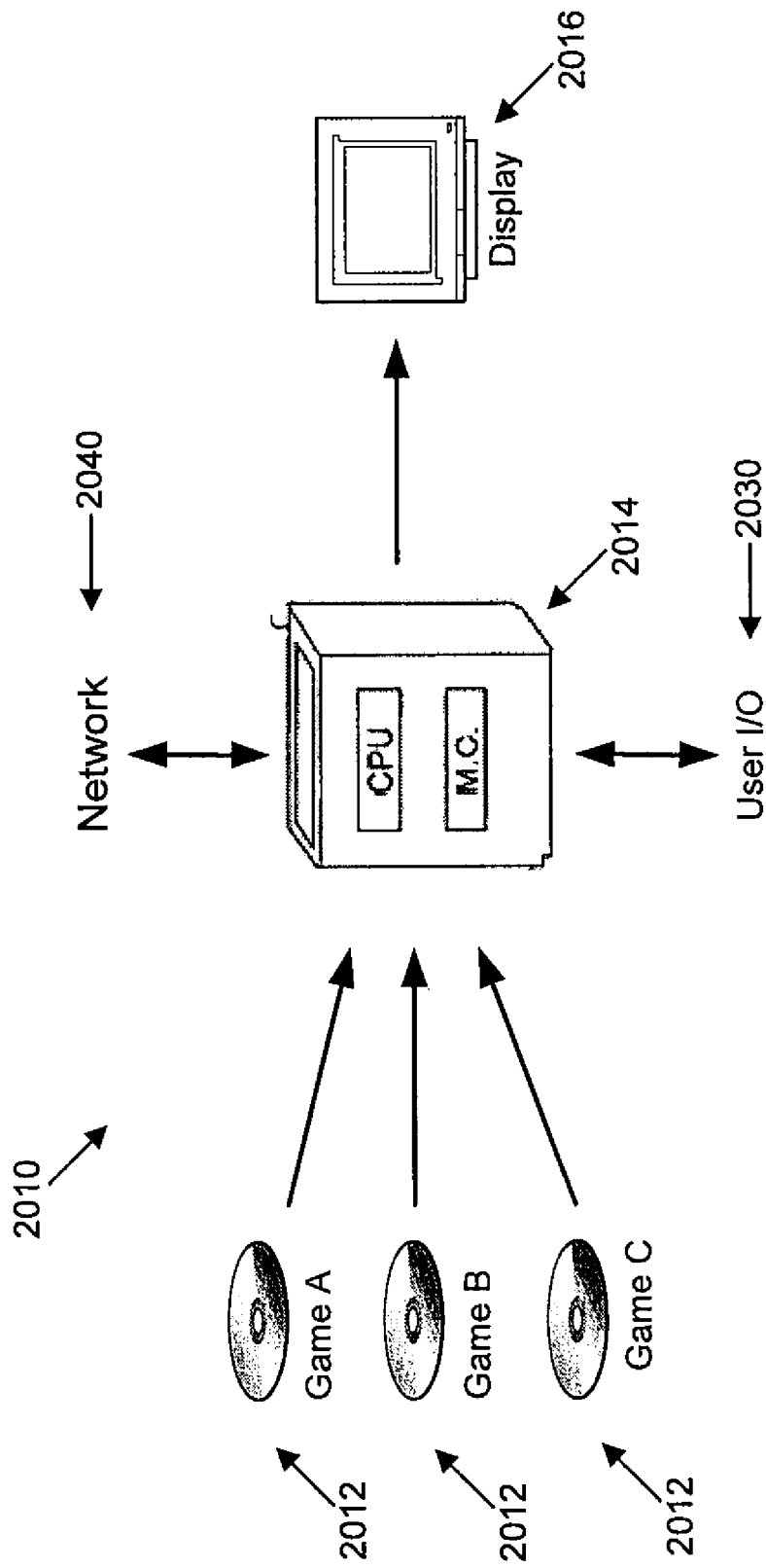
FIG. 20 illustrates a game system for providing one or more games for a user according to an embodiment.
Figure 21:
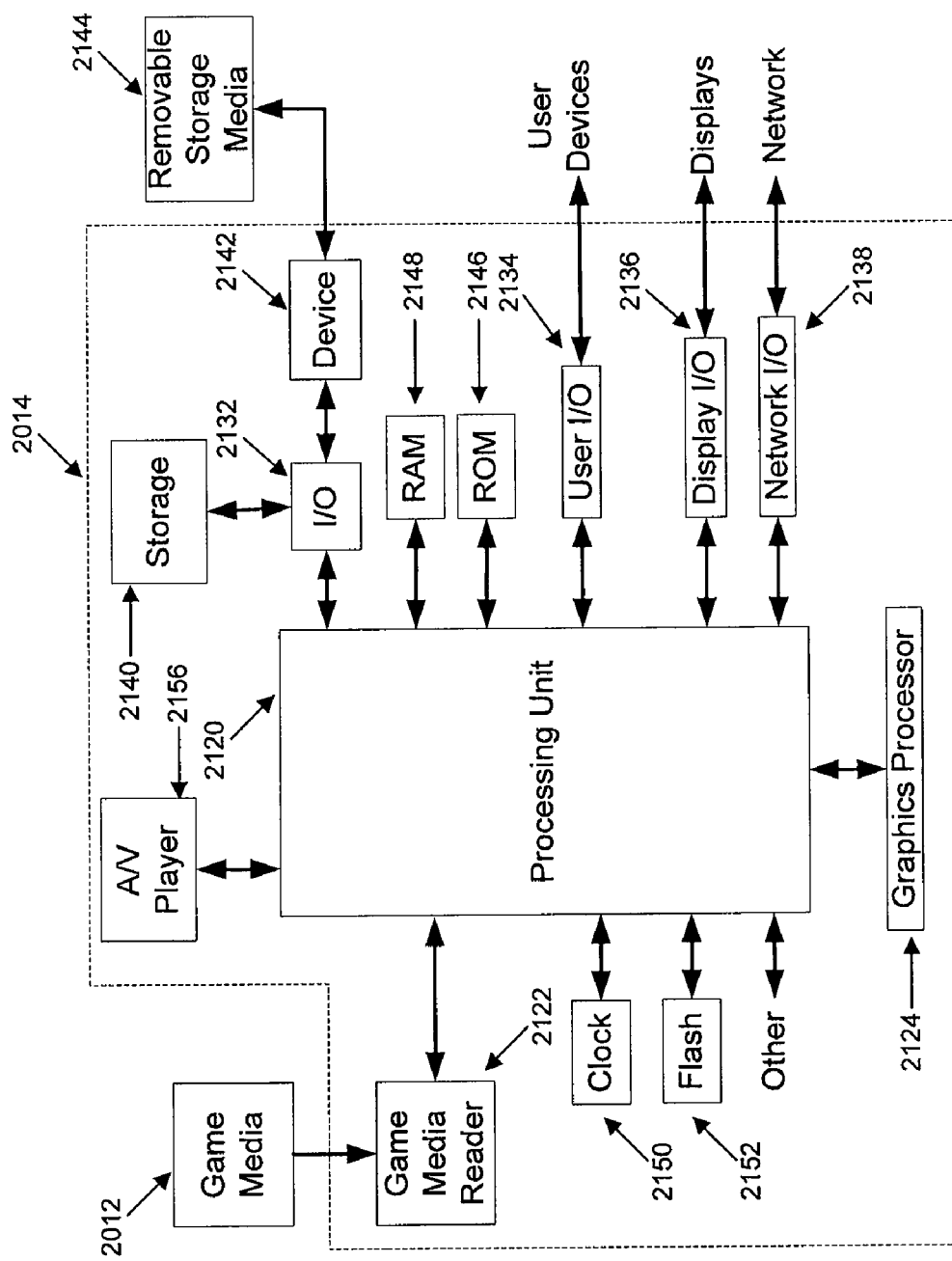
FIG. 21 illustrates an embodiment of a game device according to the present invention that forms part of the game system shown in FIG. 20 according to an embodiment.

FIG. 20 illustrates game system 2010 for providing one or more games for a user according to embodiments of the present invention. System 2010 is shown including one or more game media 2012 (game A, game B, game C), a game device 2014, and a display 2016.

Game media 2012 may include any game applications that may be used by game device 2014 to involve a user in a game. Each game medium 2012 includes logic to provide a game, denoted as game A, game B, and game C. In one embodiment, the game provided by game device 2014 is an electronic video game. Games are each individually stored on media, such as compact disk read-only memories (CD-ROMs), digital versatile disks (DVDs), game cartridges, or other storage media. A game, such as game A, is inserted in, coupled to, or in communication with game device 2014 so that game device 2014 may read all or part of a game application and/or related game data found on game media 2012. Some games might also be integrated into game device 2014.

Game device 2014 is a computing device that includes one or more processors, such as central processing units (CPUs), graphics processing units (GPUs), and data storage combined or in separate elements. Game device 2014 may also be connected to a network and game device 2014 may access games that are not included on game media 2012. Thus, according to one embodiment, game A, game B, and/or game C may be accessed through the network and not be individually stored on game media 2012. To allow a user to select from a plurality of available games available on game media 2012 or via the network, a display 2016 might present a list of the games provided by game applications on game media 2012.

A game application may be also referred to as a game code and/or a game program. A game application should be understood to include software code that game device 2014 uses to provide a game for a user to play. A game application might comprise software code that informs game device 2014 of processor instructions to execute, but might also include data used in the playing of the game, such as data relating to constants, images and other data structures created by the game developer including prerecorded animation data. A user interacts with the game application and game device 2014 through user input/output (I/O) devices.

FIG. 20 illustrates an embodiment of game device 2014 according to the present invention. It should be understood that other variations of game device 2014 may be substituted for the examples explicitly presented herein and may be appreciated by a person of skill in the art. As shown, game device 2014 includes a processing unit 2120 that interacts with other components of game device 2014 and also external components to game device 2014. A game media reader 2122 is included that communicates with game media 2012. Game media reader 2122 may be a CD-ROM or DVD unit that reads a CD-ROM, DVD, or any other reader that can receive and read data from game media 2012.

Game device 2014 may include a separate graphics processor 2124. Game device 2014 might be a handheld video game device, a console (special purpose) computing system for operating computer games such as video games, a general-purpose laptop or desktop computer, or other suitable system.

Game device 2014 also includes various components for enabling input/output, such as an I/O 2132, a user I/O 2134, a display I/O 2136, and a network I/O 2138. I/O 2132 interacts with storage element 2140 and, through a device 2142, removable storage media 2144 in order to provide storage for game device 2014. Processing unit 2120 communicates through I/O 2132 to store data, such as game state data and any shared data files. In addition to storage 2140 and removable storage media 2144, game device 2014 is also shown including ROM (read-only memory) 2146 and RAM (random access memory) 2148. RAM 2148 may be used for data that is accessed frequently, such as when a game is being played.

User I/O 2134 is used to send and receive commands between processing unit 2120 and user devices, such as game controllers. Display I/O 2136 provides input/output functions that are used to display images from the game being played. Network I/O 2138 is used for input/output functions for a network. Network I/O 2138 may be used if a game is being played online or being accessed online.

Display output signals produced by display I/O 2136 comprising signals for displaying visual content produced by game device 2014 on a display device, such as graphics, user interfaces, video, and/or other visual content. Game device 2114 may comprise one or more integrated displays configured to receive display output signals produced by display I/O 2136. According to some embodiments, display output signals produced by display I/O 2136 may also be output to one or more display devices external to game device 2014, such a display 2016.

Game device 2014 also includes other features that may be used with a game, such as a clock 2150, flash memory 2152, and other components. An audio/video player 2156 might also be used to play a video sequence, such as a movie. It should be understood that other components may be provided in game device 2014 and that a person skilled in the art will appreciate other variations of game device 2014.

Program code might be stored in ROM 2146, RAM 2148 or storage 2140 (which might comprise hard disk, other magnetic storage, optical storage, other storage or a combination or variation of these). In a common arrangement, part of the program code is stored in ROM that is programmable (ROM, PROM, EPROM, EEPROM, etc.) and part of the program code is stored on removable media such as game media 2012 (which can be a CD-ROM, cartridge, memory chip or the like, or obtained over a network or other electronic channel as needed). In general, program code can be found embodied in a tangible signal-bearing medium.

RAM 2148 (and possibly other storage) is usable to store variables and other game and processor data as needed. Typically, RAM is used and holds data that is generated during the play of the game and portions thereof might also be reserved for frame buffers, game state and/or other data needed or usable for interpreting user input and generating game displays.

As game device 2014 reads game media 2012 and provides a game, information may be read from game media 2012 and stored in a memory device, such as RAM 2148. Additionally, data from storage 2140, ROM 2146, servers through a network (not shown), or removable storage media 2146 may be read and loaded into RAM 2148. Although data is described as being found in RAM 2148, it will be understood that data does not have to be stored in RAM 2148 and may be stored in other memory accessible to processing unit 2120 or distributed among several media, such as game media 2012 and storage 2140.

The present invention provides techniques for constructing nets from particles and simulating the behavior of nets in a three-dimensional simulated environment, such as a video game. The techniques include constructing the net from a plurality of particles, simulating the behavior of the net in response to collisions with characters and/or objects, and includes post-integration corrections to ensure that objects colliding with a net do not accidentally end up on the wrong side of the net after the collision. As a result, a computer using the present invention may realistically simulate the behavior of a net allowing a significant advance in the realism of both the visual image and the animation behavior of the net when compared to system and methods known in the prior art.

While the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

What is claimed is:

1. A data processor implemented method for simulating the behavior of a net in a simulated environment, the method comprising:
   determining using a data processor a resting state of a net, the net comprising a plurality of particles wherein the motion of adjacent particles is constrained by stiff-spring constraints;
   determining using a data processor whether a collision has occurred between the net and an object;
   if a collision has occurred, between the net and the object, performing the following using a data processor:
      displacing one or more particles in the net in response to collision;
      resolving position constraint violations caused by displacing one or more particles in the net in response to collision;
      determining whether the object is positioned on a same side of the net where the object was positioned prior to the collision; and
      relocating the object to the same side of the net where the object was positioned prior to the collision if the object is determined not to be positioned on the same side of the net as prior to the collision; and
   generating using a data processor an output signal comprising a series of images that, when displayed on a display device, represents a view of the simulated environment, including the net, wherein the images represent a sequence of movements from frame to frame of the net.

2. The method of claim 1 wherein determining a resting state of the net further comprises:
   displacing at least a portion of the particles of the net in response to one or more external forces applied to the particles comprising the net, wherein the external forces are not the result of a collision between the net and an object;
   iteratively determining whether a constraint violation has occurred for each stiff-spring constraint comprising the net as a result of particles constrained by the stiff-spring constraint being displaced in response to the external forces being applied to the particles comprising the net; and
   if a constraint violation is determined to have occurred, displacing at least one particle constrained by the stiff-spring constraint to resolve the constraint violation;
   wherein the steps of iteratively determining whether a constraint violation has occurred and displacing at least one particle constrained by the stiff-spring constraint are performed until no constraint violations are detected.

3. The method of claim 1 wherein the particles comprising the net are arranged in a grid-like pattern, and wherein movement of adjacent particles is constrained by stiff-spring constraints.

4. The method of claim 3 wherein movement of at least a subset of the particles is constrained by fixed constraints.

5. The method of claim 1 wherein determining whether a collision has occurred between the net and an object further comprises:
   dividing the net into a plurality of segments, wherein each segment comprises a plurality of adjacent particles; and
   for each of the segments, determining whether a collision between the object and the segment has occurred, wherein determining whether a collision between the object and the segment has occurred further comprises:
      subdividing current timestep into a plurality of sub-timesteps such that the distance traveled between sequential sub-timesteps by each of the plurality of particles comprising the segment is no larger than a fraction of a radius of the object;
      determining a position of the segment for each of the plurality of sub-timesteps;
      subdividing a path of the object into a plurality of subsections, each subsection corresponding to a portion of the path of the object for a sub-timestep;
      determining, for each sub-timestep, whether the subsection of the path of the object associated with the sub-timestep intersects the segment at the position of the segment at the sub-timestep.

6. The method of claim 5 wherein each segment comprises four particles such that the particles form a four-sided shape where each edge of the four-sided shape corresponds to a spring constraint associated with two of the particles comprising the segment; and wherein determining whether a collision has occurred between the net and an object further comprises:
   dividing each segment into four triangles; and
   wherein determining whether a collision has occurred with the segment further comprises:
      determining whether a subsection of the path of the object intersects with one of the four triangles.

7. The method of claim 6 wherein the fraction of a radius of the object equals one third of the radius of the object.

8. The method of claim 1 wherein displacing one or more particles in the net in response to collision further comprises:
   identifying a subset of particles closest to a point of impact between the object and the net;
   displacing each of the particles in the subset based upon the velocity of the ball and the position of the particle relative to the center of the object.

9. The method of claim 1 wherein resolving position constraint violations caused by displacing one or more particles in the net in response to collision further comprises:
   iteratively testing each of the stiff-spring constraints comprising the net for a constraint violation:
      comparing a distance between a first particle and a second particle constrained by a stiff-spring constraint,
      determining whether the distance between the first particle and the second particle is not equal to a distance associated with the stiff-spring constraint; and
      if the distance between the first particle and the second particle is not equal to the distance associated with the stiff-spring constraint, moving at least the first particle in relation to the second particle or the second particle in relation to the first particle so that the distance between the first particle and the second particle is equal to the distance associated with the stiff-spring constraint.

10. The method of claim 9 wherein if the first particle is fixed in position by a fixed constraint, moving the second particle in relation to the first particle so that the distance between the first particle and the second particle is equal to the distance associated with the stiff-spring constraint or if the second particle is fixed in position by a fixed constraint, moving the first particle in relation to the second particle so that the distance between the first particle and the second particle is equal to the distance associated with the stiff-spring constraint.

11. The method of claim 9 wherein if neither the first particle nor the second particle is fixed in position by a fixed constraint, moving both of the first particle and the second particle so that the distance between the first particle and the second particle is equal to the distance associated with the stiff-spring constraint and a relative distance that the first particle is moved is equal to a relative distance that the second particle is moved.

12. The method of claim 1 wherein determining whether the object is positioned on a same side of the net where the object was positioned prior to the collision further comprises:
   subdividing the net into a plurality of triangles, wherein the vertices of the triangles comprise particles of the net;
      determining an inward-facing normal for each of the plurality of triangles;
      determining a side of the net upon which the object is positioned based upon the inward-facing normal at the time the collision is detected;
      determining a side of the net upon which the object is positioned based upon the inward-facing normal after resolving the stiff-spring constraint violations caused by displacing one or more particles in the net in response to collision; and
      comparing the side of the net upon which the object is positioned at the time the collision is detected to the side of the net upon which the object is positioned after resolving the position constraint violations caused by displacing one or more particles in the net in response to collision.

13. The method of claim 12 further comprising:
   calculating the inwards-facing normal for each triangle using the cross-product of two vectors that form the triangle.

14. A non-transitory computer readable medium storing a plurality of instructions for controlling a data processor, that when executed, cause the data processor to perform one or more tasks, the plurality of instructions comprising:
   an instruction that causes the data processor to determine a resting state of a net in a simulated environment, the net comprising a plurality of particles wherein the motion of adjacent particles is constrained by stiff-spring constraints;
   an instruction that causes the data processor to determine whether a collision has occurred between the net and an object;
   an instruction that causes the data processor to execute the following instructions if a collision has been determined to have occurred:
   an instruction that causes the data processor to displace one or more particles in the net in response to collision;
   an instruction that causes the data processor to resolve position constraint violations caused by displacing one or more particles in the net in response to collision;
   an instruction that causes the data processor to determine whether the object is positioned on a same side of the net where the object was positioned prior to the collision; and
   an instruction that causes the data processor to relocate the object to the same side of the net where the object was positioned prior to the collision, if the object is determined not to be positioned on the same side of the net as prior to the collision;
   an instruction that causes the data processor to generate an output signal comprising a series of images that, when displayed on a display device, represents a view of the simulated environment, including the net, wherein the images represent a sequence of movements from frame to frame of the net.

15. The computer readable medium of claim 14 wherein the instruction that causes the data processor to determine a resting state of a net in a simulated environment further comprises:
   an instruction that causes the data processor to displace at least a portion of the particles of the net in response to one or more external forces applied to the particles comprising the net, wherein the external forces are not the result of a collision between the net and an object;
   an instruction that causes the data processor to iteratively determine whether a constraint violation has occurred for each stiff-spring constraint comprising the net as a result of particles constrained by the stiff-spring constraint being displaced in response to the external forces being applied to the particles comprising the net; and
   an instruction that causes the data processor to displace at least one particle constrained by the stiff-spring constraint to resolve the constraint violation if a constraint violation is determined to have occurred;
   wherein the data processor iteratively determines whether a constraint violation has occurred for each stiff-spring constraint comprising the net as a result of particles constrained by the stiff-spring constraint being displaced in response to the external forces being applied to the particles comprising the net until no constraint violations are detected.

16. The computer readable medium of claim 14 wherein the particles comprising the net are arranged in a grid-like pattern, and wherein movement of adjacent particles is constrained by stiff-spring constraints.

17. The computer readable medium of claim 16 wherein movement of at least a subset of the particles is constrained by fixed constraints.

18. The computer readable medium of claim 14 wherein the instruction that causes the data processor to determine whether a collision has occurred between the net and an object further comprises:
   an instruction that causes the data processor to divide the net into a plurality of segments, wherein each segment comprises a plurality of adjacent particles; and
   an instruction that causes the data processor to, for each of the segments, determine whether a collision between the object and the segment has occurred, wherein determining whether a collision between the object and the segment has occurred further comprises:
      an instruction that causes the data processor to subdivide a current timestep into a plurality of sub-timesteps such that the distance traveled between sequential sub-timesteps by each of the plurality of particles comprising the segment is no larger than a fraction of a radius of the object;
      an instruction that causes the data processor to determine a position of the segment for each of the plurality of sub-timesteps;
      an instruction that causes the data processor to subdivide a path of the object into a plurality of subsections, each subsection corresponding to a portion of the path of the object for a sub-timestep;

an instruction that causes the data processor to determine, for each sub-timestep, whether the subsection of the path of the object associated with the sub-timestep intersects the segment at the position of the segment at the sub-timestep.

19. The computer readable medium of claim 18 wherein each segment comprises four particles such that the particles form a four-sided shape where each edge of the four-sided shape corresponds to a spring constraint associated with two of the particles comprising the segment; and wherein the instruction that causes the data processor to divide the net into a plurality of segments further comprises:
an instruction that causes the data processor to divide each segment into four triangles; and
and wherein the instruction that causes the data processor to determine whether a collision has occurred between the net and an object further comprises:
an instruction that causes the data processor to determine whether a subsection of the path of the object intersects with one of the four triangles.

20. The computer readable medium of claim 19, wherein the fraction of a radius of the object equals one third of the radius of the object.

21. The computer readable medium of claim 14 wherein the instruction that causes the data processor to displace at least a portion of the particles of the net in response to one or more external forces applied to the particles comprising the net further comprises:
an instruction that causes the data processor to identify a subset of particles closest to a point of impact between the object and the net;
an instruction that causes the data processor to displace each of the particles in the subset based upon the velocity of the ball and the position of the particle relative to the center of the object.

22. The computer readable medium of claim 14 wherein the instruction that causes the data processor to resolve position constraint violations caused by displacing one or more particles in the net in response to collision further comprises:
an instruction that causes the data processor to iteratively test each of the stiff-spring constraints comprising the net for a constraint violation, the instruction further comprising:
an instruction that causes the data processor to compare a distance between a first particle and a second particle constrained by the stiff-spring constraint,
an instruction that causes the data processor to determine whether the distance between the first particle and the second particle is not equal to a distance associated with the stiff-spring constraint; and
an instruction that causes the data processor to move at least the first particle in relation to the second particle or the second particle in relation to the first particle so that the distance between the first particle and the second particle is equal to the distance associated with the stiff-spring constraint if the distance between the first particle and the second particle is not equal to the distance associated with the stiff-spring constraint.

23. The computer readable medium of claim 22, further comprising:
an instruction that causes the data processor to move the second particle in relation to the first particle if the first particle is fixed in position by a fixed constraint so that the distance between the first particle and the second particle is equal to the distance associated with the stiff-spring constraint or if the second particle is fixed in position by a fixed constraint, moving the first particle in relation to the second particle so that the distance between the first particle and the second particle is equal to the distance associated with the stiff-spring constraint.

24. The computer readable medium of claim 22, further comprising:
an instruction that causes the data processor to move both of the first particle and the second particle so that the distance between the first particle and the second particle is equal to the distance associated with the stiff-spring constraint and a relative distance that the first particle is moved is equal to a relative distance that the second particle is moved if neither the first particle nor the second particle is fixed in position by a fixed constraint.

25. The computer readable medium of claim 14 wherein the instruction that causes the data processor to determine whether the object is positioned on a same side of the net where the object was positioned prior to the collision further comprises:
an instruction that causes the data processor to subdivide the net into a plurality of triangles, wherein the vertices of the triangles comprise particles of the net;
an instruction that causes the data processor to determine an inward-facing normal for each of the plurality of triangles;
an instruction that causes the data processor to determine a side of the net upon which the object is positioned based upon the inward-facing normal at the time the collision is detected;
an instruction that causes the data processor to determine a side of the net upon which the object is positioned based upon the inward-facing normal after resolving the stiff-spring constraint violations caused by displacing one or more particles in the net in response to collision; and
an instruction that causes the data processor to compare the side of the net upon which the object is positioned at the time the collision is detected to the side of the net upon which the object is positioned after resolving the position constraint violations caused by displacing one or more particles in the net in response to collision.

26. The computer readable medium of claim 25, further comprising:
an instruction that causes the data processor to calculate the inwards-facing normal for each triangle using the cross-product of two vectors that form the triangle.

* * * * *